(12) United States Patent
Li

(10) Patent No.: US 10,203,702 B2
(45) Date of Patent: Feb. 12, 2019

(54) DRUG DOSING DEVICE AND METHOD FOR DOSAGE METERING AND CONTROL

(71) Applicant: BEIJING UNITY BENEFICIAL TECHNOLOGY CO., LTD, Beijing (CN)

(72) Inventor: Shengxian Li, Beijing (CN)

(73) Assignee: BEIJING UNITY BENEFICIAL TECHNOLOGY CO., LTD, Beijing (CN)

(*) Notice: Subject to any disclaimer, the term of this patent is extended or adjusted under 35 U.S.C. 154(b) by 204 days.

(21) Appl. No.: 15/109,543

(22) PCT Filed: Dec. 5, 2014

(86) PCT No.: PCT/CN2014/093117
§ 371 (c)(1),
(2) Date: Jul. 1, 2016

(87) PCT Pub. No.: WO2015/101134
PCT Pub. Date: Jul. 9, 2015

(65) Prior Publication Data
US 2016/0327960 A1    Nov. 10, 2016

(30) Foreign Application Priority Data

Jan. 3, 2014 (CN) .......................... 2014 1 0003632

(51) Int. Cl.
*F17D 1/00* (2006.01)
*G05D 7/00* (2006.01)
(Continued)

(52) U.S. Cl.
CPC ............. *G05D 7/00* (2013.01); *E21B 21/062* (2013.01); *E21B 33/068* (2013.01); *E21B 41/02* (2013.01)

(58) Field of Classification Search
CPC ........ G05D 7/00; E21B 21/062; E21B 33/068
(Continued)

(56) References Cited

U.S. PATENT DOCUMENTS

2006/0102355 A1* 5/2006 Ayres ................... E21B 33/068
166/310
2006/0278283 A1* 12/2006 Gouzou .................. F02D 19/12
137/571

(Continued)

OTHER PUBLICATIONS

Nov. 2, 2015, Chinese Office Action for related CN application No. 201410003632.3.
(Continued)

*Primary Examiner* — Reinaldo Sanchez-Medina
(74) *Attorney, Agent, or Firm* — Paratus Law Group, PLLC

(57) ABSTRACT

A drug dosing device and method for dosage metering and control, the drug dosing device including a drug dosing canister, a first flow channel, a second flow channel, a third flow channel, a metering flow channel, a switch valve, a control valve and a pressure release port; the upper part or top of the drug dosing canister communicates with the upper part or top of the metering flow channel via the first flow channel; the lower part or bottom of the drug dosing canister communicates with the lower part or bottom of the metering flow channel via the second flow channel; the switch valve disposed on the second flow channel; the bottom or lower part of the metering flow channel communicates with the control valve via the third flow channel; the pressure release port is disposed at the upper part or top of the drug dosing canister; and the cross section area of the metering flow channel is less than the cross section area of the drug dosing canister.

27 Claims, 12 Drawing Sheets

(51) Int. Cl.
    *E21B 33/068*     (2006.01)
    *E21B 41/02*     (2006.01)
    *E21B 21/06*     (2006.01)

(58) Field of Classification Search
    USPC .................................................. 137/571, 572
    See application file for complete search history.

(56) References Cited

U.S. PATENT DOCUMENTS

2010/0243255 A1*   9/2010   Luharuka .............. E21B 21/062
                                                                                             166/308.1
2017/0216539 A1*   8/2017   Huber ................... A61B 5/0873

OTHER PUBLICATIONS

Mar. 15, 2016, Chinese Office Action for related CN application No. 201410003632.3.

* cited by examiner

DRUG DOSING DEVICE AND METHOD FOR DOSAGE METERING AND CONTROL

CROSS REFERENCE TO PRIOR APPLICATION

This application is a National Stage Patent Application of PCT International Patent Application No. PCT/CN2014/093117 (filed on Dec. 5, 2014) under 35 U.S.C. § 371, which claims priority to Chinese Patent Application No. 201410003632.3 (filed on Jan. 3, 2014), which are all hereby incorporated by reference in their entirety.

TECHNICAL FIELD

The present invention relates to a drug dosing device and method, and particularly relates to a drug dosing device and method for dosage metering and control. The present invention can be applied to various systems which requires to add functional chemical agents, such as gas wells, oil wells, pipelines, facilities, etc.

BACKGROUND

To ensure normal production and operation of fluid channels (generally referred to as flow channels) of gas wells, oil wells, water wells, gas pipelines, oil pipelines, water pipelines, pipe fittings, instruments, etc. and to solve a production problem or achieve a production purpose, it is generally necessary to add functional chemical agents (commonly known as drugs) to the flow channels and facilities, which is commonly known as drug dosing. For example: to ensure that no hydrate blockage is formed in the gas wells and the gas pipelines, the method of adding hydrate inhibitors such as methanol, etc. is generally adopted in China; to reduce corrosion and scaling of the gas pipelines, the oil pipelines, the water pipelines and the pipe fittings, the method of adding corrosion inhibitors, scale inhibitors and bactericides is generally adopted in China; to solve the problem of the influence of physical properties of crude oil on the production of the oil wells, auxiliaries for oil extraction such as viscosity reducer, pour point depressants, paraffin removers, etc. are generally added to the oil wells in China; to solve the problem of oil-water separation, demulsifiers are generally added to crude oil pipelines or dehydrators in China; to treat oilfield sewage, flocculating agents and degreasing agents are generally added to sewage pipelines or sewage treatment systems in China; and so on.

Because the flow channels of the gas wells, etc. have fluids with higher pressure and the pressure of some fluids is even above 20 MPa, it is necessary to adopt a specific drug dosing device and drug dosing method for adding the functional chemical agents to the flow channels.

At present, a drug dosing device and a drug dosing method used for the flow channels in China include a drug dosing method of a metering pump, and a drug dosing method of a drug dosing canister (commonly called a drug dosing pack); the drug dosing method of the drug dosing canister is also classified into a periodic drug dosing method of a small drug dosing canister and a continuous drug dosing method of a balance type drug dosing canister (commonly called a drug dosing method of a gravitation canister); and the above drug dosing methods have different defects.

The Drug Dosing Method of the Metering Pump:

The method uses the metering pump for adding the functional chemical agents to the flow channels, and has the following defects:

1) The method has larger energy consumption and larger fixed investment, and needs to construct a special drug dosing pump house or a mobile drug dosing device.

2) The method often needs to pave a long-distance drug dosing pipeline, causing enormous investment of ground construction.

Taking a Jingbian gas field as an example, a gas well and a well site have no commercial power supply. To add methanol to ground pipelines of the gas well and the well site, the method of constructing a special methanol injecting pump house and a long-distance methanol injecting pipeline is generally used currently; and the methanol injecting pipeline has a general length of 1000 m to 5000 m, causing enormous ground investment.

3) The method cannot meet the production need of the gas well when solar energy is used for power supply.

Taking the Jingbian gas field as an example: the gas well of the gas field needs to add the methanol continuously for all-weather 24 hours; and if continuous cloudy and rainy weather appears, a solar panel cannot effectively supply power for the metering pump.

4) The metering pumps such as plunger pumps, diaphragm pumps, etc. used in the method have moving components, are extremely easy to generate operation fault, and need higher energy consumption and operation and maintenance cost for maintaining operation.

The Periodic Drug Dosing Method of the Small Drug Dosing Canister:

The method periodically adds the functional chemical agents to the flow channels of the gas well, the oil well, the oil and gas pipelines, etc., by using a drug dosing canister with the effective volume of less than 10 L. As shown in FIG. 1, the drug dosing device generally comprises a drug dosing canister 100, a drug dosing pipeline 101, an upper valve 102, a lower valve 103 and a bell mouth 104. The drug dosing canister 100 used in the method has lighter weight, is generally vertically installed on the upper part of a flow channel 105, and can enable the functional chemical agents in the drug dosing canister 100 to automatically flow into the flow channel 105 via self gravity. The method has the following defects:

1) the drug dosing canister used in the method has small effective volume, is not provided with a pressure balance pipe, cannot satisfy the production need of continuous drug dosing for all-weather 24 hours to the flow channels of the gas well, the sleeve of the oil well, a natural gas pipeline, etc., and only can be used for periodic drug dosing of the flow channels.

It is known from the common knowledge in the art that: as shown in FIG. 1, the drug dosing canister 100 in the periodic drug dosing method of the small drug dosing canister has no pressure balance pipe; if the drug dosing pipeline 101 below the drug dosing canister 100 has a small inner diameter or the degree of opening of the lower valve 103 is very small, when the drug in the drug dosing canister 100 automatically flows into the flow channel 105, it is difficult for gas in the flow channel 105 to rise and enter the drug dosing canister 100, and the drug dosing canister 100 will form certain vacuum degree, which causes that the drug in the canister cannot automatically flow into the flow channel 105; and if the drug dosing pipeline 101 below the drug dosing canister 100 has a larger inner diameter or the degree of opening of the lower valve 103 is larger, the chemical agent in the drug dosing canister 100 will soon flow into the flow channel 105, which causes that it is difficult to achieve the purpose of continuous drug dosing.

It is known from the common knowledge in the art that: the functional chemical dosage added to the gas well or natural gas pipeline is generally large; for example, in the Jingbian gas field, every day methanol is added to the gas well or a gas gathering pipeline with 30-200 L/day; the drug dosing canister with the effective volume of less than 10 L can only be used for periodic drug dosing of the gas well and the natural gas pipeline; for example, in a Sulige gas field, the drug dosing canister with the effective volume of less than 10 L is used once for periodically adding the methanol to an oil pipe of the gas well, and the natural gas pipeline of the well site; and no data and application paradigm are disclosed currently in China about the use of the drug dosing canister of which the effective volume is less than 10 L for continuous drug dosing for all-weather 24 hours to the gas well and the natural gas pipeline.

It is known from the common knowledge in the art that: a domestic oil well often uses the drug dosing canister with the effective volume of less than 10 L for periodically adding the viscosity reducer and the corrosion inhibitors to the oil pipe of the oil well; and there is no data and application paradigm disclosed currently in China about the use of the drug dosing canister with the effective volume of less than 10 L for continuous drug dosing for all-weather 24 hours to the oil pipe of the oil well.

It is known from the common knowledge in the art that: the metering pumps are generally used in China for adding the corrosion inhibitors and the scale inhibitors to the water pipelines; and there is no data and application paradigm disclosed currently in China about the use of the drug dosing canister with the effective volume of less than 10 L for continuous drug dosing for all-weather 24 hours to the water pipelines.

2) Before the drug dosing canister is used in the method for drug dosing to the flow channel every time, the gas in the drug dosing canister must be first emptied, so the method not only has potential safety hazard, but also has large labor intensity.

As shown in FIG. 1, after the chemical agent in the drug dosing canister 100 is exhausted, the upper valve 102 of the drug dosing canister must be opened, and after the gas in the drug dosing canister 100 is emptied, a new chemical agent is added to the drug dosing canister 100. Then the upper valve 102 of the drug dosing canister 100 must be closed and the lower valve 103 of the drug dosing canister must be opened, so that the chemical agent in the drug dosing canister 100 automatically flows into the flow channel 105.

It is known from the common knowledge in the art that: most of the functional chemical agents (e.g., methanol) are harmful for human bodies, and operators may be hurt when the gas in the drug dosing canister is accidentally emptied.

3) The drug dosing canister of the method is not provided with a level gauge and a flowmeter, and the flow of the functional chemical agents flowing from the drug dosing canister cannot be metered. The operators can only judge the liquid level of the drug dosing canister by virtue of individual feelings and experience, and can only control the flow of the functional chemical agents by virtue of personal experience.

It is known from the common knowledge in the art that: there is no practical application significance for the drug dosing canister with the effective volume of less than 10 L to be provided with the level gauge and the flowmeter, and there is no application paradigm and disclosed data of installing the level gauge and the flowmeter on the drug dosing canister with the effective volume of less than 10 L currently in China.

The Continuous Drug Dosing Method of the Balance Type Drug Dosing Canister:

the method uses the drug dosing canister with the effective volume of greater than 10 L and the pressure balance pipeline for continuously adding the functional chemical agents to the flow channels. As shown in FIG. 2, the drug dosing device generally comprises a drug dosing canister 200 (having a level gauge 201), a bracket 202, a drug dosing pipeline 203, a pressure balance pipeline 204, a flowmeter 205 and a valve 206. The drug dosing canister 200 of the method has heavier weight, is difficult to be directly vertically installed on the flow channel 207 and is generally installed near the gas well, the oil well and the pipeline. The working principle and the drug dosing process of the method are: making the height of the bottom of the drug dosing canister 200 higher than that of the flow channel 207 by using the bracket 202; communicating the bottom of the drug dosing canister 200 with the flow channel 207 by using the drug dosing pipeline 203; communicating the upper part of the drug dosing canister 200 with the flow channel 207 by using the pressure balance pipeline 204; the pressure in the drug dosing canister 200 realize a balance with the pressure in the flow channel 207; and the chemical agent in the drug dosing canister 200 can automatically flow into the flow channel 207 via self gravity. The method has the following defects:

1) Although the drug dosing canister 200 of the method is provided with the level gauge 201, the designed level gauge 201 is only used for displaying the height of the liquid level (commonly called a canister level) in the drug dosing canister and cannot meter, display and control the flow of the chemical agent flowing from the drug dosing canister.

The disclosed data shows that: the level gauge disposed on the container (canister) is used for displaying the height of the liquid level in the container (canister), and no disclosed data shows that the level gauge disposed on the container (canister) can be used for metering and displaying the flow of the liquid flowing from the container (canister) currently. There is no disclosed data and application paradigm in the art currently about the use of the level gauge disposed on the drug dosing canister for metering, displaying and controlling the flow of the chemical agent flowing from the drug dosing canister.

2) When the flow of the functional chemical agent (commonly called a drug dosing flow) flowing from the drug dosing canister 200 used in the method is smaller, the flow is less than the minimum range of a currently known flowmeter in China, causing that the drug dosing flow which flows from the drug dosing canister cannot be metered and the actual need of continuous drug dosing cannot be satisfied.

It is known from the common knowledge in the art that: when the minimum ranges of various known flowmeters used currently in the domestic continuous drug dosing method of the balance type drug dosing canister exceed 2.5 L/hr (being equivalent to 60 L/day), the drug dosing flow less than 2.5 L/hr cannot be effectively metered.

Taking the Jingbian gas field as an example: the gas field adopts a production process of continuously adding the methanol to the gas well (or the gas gathering pipeline) for 24 hours, and the drug dosage of the methanol is generally 30-200 L/day, being equivalent to the drug dosing flow of 1.25-8.3 L/hr.

Taking a Yanchang gas field as an example: the gas field adopts a production process of continuously adding the hydrate inhibitors to the gas well (or the gas gathering pipeline) for 24 hours, and the drug dosage of the hydrate inhibitors is generally 5-30 L/day, being equivalent to the drug dosing flow of 0.2-1.25 L/hr.

The disclosed data shows that: current kinds of flowmeters used for liquid metering are classified into a volumetric flowmeter (e.g., a gear meter, a waist wheel flowmeter, a rotating piston flowmeter and a scraper flowmeter), a vane wheel type flowmeter (e.g., a water meter and a turbine flowmeter), a differential pressure flowmeter, a variable-area flowmeter (e.g., a float flowmeter and a rotor flowmeter), a momentum type flowmeter, an impulse type flowmeter, an electromagnetic flowmeter, an ultrasonic flowmeter, a fluid oscillation type flowmeter (e.g., a vortex street flowmeter and a vortex flowmeter) and a coriolis mass flowmeter, all of which need to install a filter.

It is known from the common knowledge in the art that: when the minimum ranges of the current domestic gear meter, the waist wheel flowmeter, the rotating piston flowmeter and the scraper flowmeter are 40 L/hr (being equivalent to 960 L/day) and the minimum ranges of the water meter and the vortex flowmeter are 30 L/hr (being equivalent to 720 L/day), the ranges and precision are directly related to the viscosity of a measured liquid; the functional chemical agents have an enormous viscosity difference; for example, the viscosity of the viscosity reducer and foaming agents is hundreds of times of the viscosity of the methanol and the scale inhibitors; if such flowmeters are used for metering the flow of the functional chemical agents, each chemical agent is required to be checked and calibrated again; for example, when the water meter is dispatched from the factory, the range and the precision are calibrated with clean water; when the water meter is used for metering the viscosity reducer and the foaming agents, a dial or secondary display meter thereof must be recalibrated; otherwise, an enormous metering error may be generated; therefore, such flowmeters cannot meter the drug dosing flow of the gas well of the Jingbian gas field with a methanol flow of 30-200 L/day, and cannot meter the drug dosing flow of the gas well of the Yanchang gas field with a filling flow of the hydrate inhibitors of 5-30 L/day.

It is known from the common knowledge in the art that: the differential pressure flowmeter needs to use a throttle for generating differential pressure, and the range and the precision thereof are directly related to the viscosity and the density of the measured liquid; the continuous drug dosing method of the balance type drug dosing canister relies on gravity for automatic flowing and drug dosing; the generated differential pressure is very limited, so the differential pressure required for the differential pressure flowmeter cannot be satisfied and effective metering cannot be performed; the functional chemical agents have an enormous viscosity difference and an enormous density difference; for example, the density of the methanol is 0.8 $g/cm^3$, the density of the scale inhibitors can reach 1.1 $g/cm^3$ and the density of the hydrate inhibitors can reach 1.5 $g/cm^3$; if such flowmeters are used for metering the flow of the functional chemical agents, each chemical agent is required to be checked and calibrated again; otherwise, an enormous metering error may be generated; therefore, such flowmeters cannot meter the drug dosing flow of the gas well of the Jingbian gas field with a methanol flow of 30-200 L/day, and cannot meter the drug dosing flow of the gas well of the Yanchang gas field with a filling flow of the hydrate inhibitors of 5-30 L/day.

It is known from the common knowledge in the art that: the momentum type flowmeter, the impulse type flowmeter, the vortex street flowmeter the vortex flowmeter, and the coriolis mass flowmeter require that the flowing speed of a measured medium is not too low, and the vortex street flowmeter and the vortex flowmeter also require that the flowing speed of the measured medium must be greater than the flowing speed of a laminar flow. the ranges and the precision of such flowmeters are directly related to the viscosity and the density of the measured liquid; if such flowmeters are used for metering the flow of the functional chemical agents, each chemical agent is required to be checked and calibrated again; otherwise, an enormous metering error may be generated; a current domestic known drug dosing pipeline has an inner diameter of 10 mm and the flowing speed with a methanol flow of 30 L/day is 4.4 mm/s, so the requirement of the minimum flowing speed of the measured medium required for such flowmeters cannot be satisfied and effective metering cannot be performed; therefore, such flowmeters cannot meter the drug dosing flow of the gas well of the Jingbian gas field with a methanol flow of 30-200 L/day, and cannot meter the drug dosing flow of the gas well of the Yanchang gas field with a filling flow of the hydrate inhibitors of 5-30 L/day.

It is known from the common knowledge in the art that: part of the functional chemical agents is an organic liquid; for example, the methanol is an insulator; the electromagnetic flowmeter requires that the measured medium must have certain conductivity; therefore, the electromagnetic flowmeter cannot effectively meter the methanol flow.

It is known from the common knowledge in the art that: the ultrasonic flowmeter has a resolution of 1 mm/s for the flowing speed, but cannot effectively meter the flow in a pipe with the inner diameter of less than 15 mm and the flowing speed of less than 10 mm/s; when the flow of the liquid of which the inner diameter of the pipeline is 15 mm and the flowing speed is 10 mm/s is 6.4 L/hr, which is equivalent to 153.6 L/day; therefore, the ultrasonic flowmeter cannot meter the drug dosing flow of the gas well of the Jingbian gas field with a methanol flow less than 150 L/day, and cannot meter the drug dosing flow of the gas well of the Yanchang gas field with a filling flow of the hydrate inhibitors of 5-30 L/day.

It is known from the common knowledge in the art that: the range and the precision of the float flowmeter (i.e., the rotor flowmeter) are directly related to the measured liquid, and are calibrated with clean water when dispatched from the factory; if the float flowmeter is used for metering the flow of the functional chemical agents, each chemical agent is required to be checked and calibrated again; otherwise, an enormous metering error may be generated; therefore, when the minimum range of the current domestic known float flowmeter is 2.5 L/hr (being equivalent to 60 L/day), the float flowmeter cannot meter the drug dosing flow of the gas well of the Jingbian gas field with a methanol flow less than 60 L/day, and cannot meter the drug dosing flow of the gas well of the Yanchang gas field with a filling flow of the hydrate inhibitors of 5-30 L/day.

It is known from the common knowledge in the art that: a tilting metering separator is often used for metering produced liquid of the oil well, has a minimum range of 1000 L/day, cannot meter the drug dosing flow of the gas well of the Jingbian gas field with a methanol flow of 30-200 L/day, and cannot meter the drug dosing flow of the gas well of the Yanchang gas field with a filling flow of the hydrate inhibitors of 5-30 L/day. There is no application paradigm or disclosed data currently in China about the tilting metering separator of which the minimum range is less than 1000 L/day.

It is known from the common knowledge in the art that: a tilting metering device for metering rainfall exists currently in China, but the device cannot be used for metering the flow of the liquid in the flow channels of pipelines, etc.; and there is no application paradigm or disclosed data currently in China about the use of such device for metering the flow of the liquid in the flow channels.

3) When the drug dosing flow which flows from the drug dosing canister 200 used in the method cannot be metered by the flowmeter 205, the method can only realize control of the drug dosing flow depending on the change value of the liquid level displayed by the level gauge 201 of the drug dosing canister 200 in unit time through a method of manually controlling the degree of opening of the valve 206, inevitably causing extremely slow control work of the drug dosing flow, so the needs of the flow channels for production and operation cannot be satisfied.

It is known from the common knowledge in the art that: because of large fluctuation of various production parameters (e.g., fluid flow, pressure, temperature, etc.) of the flow channels, the production parameters cannot be constant; environmental temperature and ground temperature cannot be constant; the flow of the functional chemical agents continuously added to the flow channels is inevitably often controlled; and the control of the drug dosing flow (or drug dosage) is an important and frequent working content in management of the flow channels of the gas wells, the oil wells, the pipelines, etc.

Taking the Jingbian gas field as an example: the methanol is continuously added for 24 hours to most of the gas wells and the natural gas pipelines of the gas field for inhibiting the formation of natural gas hydrates; the capability of the methanol for inhibiting the formation of the hydrates is directly related to the production parameters of gas yield, water yield, pressure, temperature, etc. of the gas well; if the water yield of the gas well is suddenly increased, or the pressure of the gas well is suddenly increase, or the gas yield of the gas well is suddenly decreased, or the ground environmental temperature is suddenly decreased, the quantity of the methanol continuously added to the gas well and the natural gas pipeline must be increased as soon as possible; otherwise, the hydrates may be formed, blocking the gas well and the natural gas pipeline.

It is known from the common knowledge in the art that: the continuous drug dosing method of the balance type drug dosing canister adopts a manual method for controlling the drug dosing flow, i.e., increasing or decreasing the drug dosing flow according to the display of instantaneous flow data of the flowmeter on the drug dosing pipeline through a method of manually controlling the degree of opening of the valve; therefore, when the flowmeter on the drug dosing pipeline cannot effectively and accurately display an instantaneous drug dosing flow, the operators cannot use the flowmeter for controlling the degree of opening of the valve, and can only control the degree of opening of the valve according to the decreased value of the liquid level of the level gauge of the drug dosing canister in unit time; if the cross section area of the drug dosing canister is large and the drug dosing flow is small, the operators need a long time for controlling the valve to a required degree of opening and need a long time for controlling the drug dosing flow to a required flow.

Taking the Jingbian gas field in which the methanol is added continuously to the gas well in 1.25 L/hr (i.e., 30 L/day) as an example: to reduce the number of times and cost for supplementing the functional chemical agents into the drug dosing canister, the effective volume of the drug dosing canister shall not be too small, and a horizontal cylindrical drug dosing canister (with the effective volume greater than 180 L and the maximum cross section area of 0.6 $m^2$) with an inner diameter of 400 mm and a length of 1500 mm can be adopted for continuously adding the methanol for 6 days to the gas well with the drug dosing flow of 1.25 L/hr (i.e., 30 L/day); a vertical cylindrical drug dosing canister (with the effective volume greater than 250 l and the cross section area of 0.5 $m^2$) with an inner diameter of 800 mm and a height of 500 mm can also be adopted for continuously adding the methanol for 8 days to the gas well with the drug dosing flow of 1.25 L/hr (i.e., 30 L/day); and because the existing domestic known flowmeter cannot meter the flow of the methanol with the drug dosing flow of 1.25 L/hr (i.e., 30 L/day), the operators can only control the degree of opening of the valve according to the decreased value of the liquid level of the level gauge of the drug dosing canister in unit time. It is known from the common knowledge in the art that: when the reading change value of the level gauge is less than 5 mm, eyes of the operators or the ultrasonic level gauge is difficult to accurately judge the change of the liquid level; computed according to the decrease of 5 mm of the liquid level of the vertical cylindrical drug dosing canister with the inner diameter of 800 mm and the height of 500 mm, it is known from the computation of the common knowledge in the art that the functional chemical dosage which flows from the drug dosing canister is 3 L and the effluent time in accordance with the drug dosing flow of 1.25 L/hr is 2.4 hours; therefore, the operators need to wait for 2.4 hours after controlling the degree of opening of the valve so as to judge whether the controlled degree of opening of the valve is reasonable and judge whether the drug dosing flow is reasonable; because the operators have no guidance of flowmeter data and the control of the degree of opening of the valve inevitably has great blindness, the operators cannot control the degree of opening of the valve to a reasonable position within a short time only according to the indication of the level gauge, cannot control the drug dosing flow to a reasonable flow within a short time, and need a long time for successful control; and computed according to 3 times of control, the operators need to work for 7.2 hours to control the drug dosing flow to the required flow. It is known from the common knowledge in the art that: the condition that the production parameters of the gas well are greatly changed often occurs; if the gas well needs to increase the drug dosing flow of the methanol due to the change of the production parameters, the flow of the methanol cannot be increased to the required drug dosing flow of the gas well within 1 hour, causing a production accident that the gas wells and the pipelines are blocked by the hydrates; otherwise, if the gas well needs to decrease the drug dosing flow of the methanol due to the change of the production parameters, the flow of the methanol cannot be decreased to the required drug dosing flow of the gas well within 1 hour, causing the waste of the methanol and an increase of the production cost of the gas well; therefore, the method of manually controlling the drug dosing flow greatly increases the labor intensity of the operators, brings great difficulty to management of the gas well and cannot satisfy the production need of quickly controlling the drug dosing flow required by the flow channels of the gas well, the pipeline, etc.

Taking the Yanchang gas field in which the hydrate inhibitors are added continuously to the gas well in 0.5 L/hr (i.e., 12 L/day) as an example: to reduce the number of times and cost for supplementing the drugs into the drug dosing canister, the effective volume of the drug dosing canister shall not be too small, and a horizontal cylindrical drug dosing canister (with the effective volume greater than 180

L and the maximum cross section area of 0.6 m$^2$) with an inner diameter of 400 mm and a length of 1500 mm can be adopted for continuously adding the hydrate inhibitors for 15 days to the gas well with the drug dosing flow of 0.5 L/hr (i.e., 12 L/day). It is known from the common knowledge in the art that: when the reading change value of the level gauge is less than 2 mm, eyes of the operators or the ultrasonic level gauge is difficult to accurately judge the change of the liquid level; computed according to the decrease of 2 mm with the maximum cross section area of 0.6 m$^2$ for the liquid level of the horizontal cylindrical drug dosing canister with the inner diameter of 400 mm and the length of 1500 mm, the functional chemical dosage which flows from the drug dosing canister is 1.2 L and the effluent time in accordance with the drug dosing flow of 0.5 L/hr is 2.4 hours; therefore, the operators need to wait for 2.4 hours after controlling the degree of opening of the valve so as to judge whether the controlled degree of opening of the valve is reasonable and judge whether the drug dosing flow is reasonable; because the operators have no guidance of flowmeter data and the control of the degree of opening of the valve inevitably has great blindness, the operators cannot control the degree of opening of the valve to a reasonable position for one time only according to the indication of the level gauge, cannot control the drug dosing flow to a reasonable flow for one time only, and need many times of control; and computed according to 3 times of control, the operators need to work for 7.2 hours to control the drug dosing flow to the required flow. It is known from the common knowledge in the art that: the condition that the production parameters of the gas well are greatly changed often occurs; if the gas well needs to increase the drug dosing flow of the hydrate inhibitors due to the change of the production parameters, the flow of the hydrate inhibitors cannot be increased to the required drug dosing flow of the gas well within 1 hour, causing a production accident that the gas wells and the pipelines are blocked by the hydrates; otherwise, if the gas well needs to decrease the drug dosing flow of the hydrate inhibitors due to the change of the production parameters, the flow of the hydrate inhibitors cannot be decreased to the required drug dosing flow of the gas well within 1 hour, causing the waste of the hydrate inhibitors and an increase of the production cost of the gas well; therefore, the method of manually controlling the drug dosing flow greatly increases the labor intensity of the operators, brings great difficulty to management of the gas well and cannot satisfy the production need of quickly controlling the drug dosing flow required by the flow channels of the gas well, the pipeline, etc.

4) The flowmeter 205 designed in the method can only be used for metering the drug dosing flow, and cannot display the liquid level of the drug dosing canister.

In conclusion, the above drug dosing device and the drug dosing method thereof are not convenient for drug metering and control in case of adding the functional chemical agents in a small flow.

SUMMARY

A "fluid" in the present invention: means any substance which can normally flow in a pipeline, such as a gas phase fluid (e.g., natural gas), a liquid phase fluid (e.g., water), a gas-liquid mixed fluid (e.g., oil gas), a solid-liquid mixed fluid (e.g., a flocculant-water mixture), etc.

A "well head" in the present invention: also known as a gas production tree or oil production tree, means a vertical part of a gas well or oil well exposed from the ground, and is generally provided with pipe fittings such as a valve, a pressure gauge, a four-way valve, etc., as well as an oil pipe outlet and a sleeve outlet.

"Oil pipe pressure" in the present invention: generally referred to as oil pressure, means pressure displayed on a pressure gauge of an oil pipe of a well head of a gas well or a well head of an oil well, i.e., namely the pressure of an oil-gas fluid which comes out of the oil pipe of the well head.

"Sleeve pressure" in the present invention: generally referred to as casing pressure, means pressure displayed on a pressure gauge of a sleeve of a well head of a gas well or a well head of an oil well.

A "dosage" in the present invention: commonly called a functional chemical agent, generally presented as a liquid or fluid state under normal temperature and pressure, and sometimes referred to as a drug.

"Drug dosing" in the present invention: commonly called addition of the functional chemical agent in the field, and sometimes especially referred to as a process of adding a liquid chemical agent to an oil pipe, a sleeve and a pipeline.

A "drug dosage" in the present invention: referred to as addition of a functional chemical dosage, and sometimes also known as a drug dosing flow.

The "drug dosing flow" in the present invention: also known as a dosage flow and referred to as a functional chemical agent flow, generally means a volume flow of the functional chemical agent.

A "drug dosing canister" in the present invention: commonly called a drug dosing pack, means a container for containing the functional chemical agent in a drug dosing device, and sometimes also means a drug dosing device for "drug dosing" by using the container.

A "pipe fitting" in the present invention: means a part capable of connecting pipes into a pipeline, such as an elbow, a flange, a three-way pipe, a four-way pipe, a reducer, a thread head, a slipknot, a pipe hoop, a Y-shaped pipe, an X-shaped pipe joint, a quick joint, a valve, etc., and sometimes also means a flowmeter, a pressure gauge, etc.

The first technical problem to be solved in the present invention is to provide a drug dosing device for dosage metering and control. The drug dosing device overcomes the defect of the existing drug dosing device, can effectively solve the problem of metering and controlling the drug dosing flow of the existing drug dosing device, can simplify the drug dosing device and drug dosing process, can save the drug dosage, and can reduce the cost and management workload of the drug dosing device. The drug dosing device has the advantages and features of easy implementation, safety, reliability, wide application, easy popularization, etc.

The second technical problem to be solved in the present invention is to provide a method for flow metering and control of the above device. The method overcomes the defect of metering the flow of the existing drug dosing device, can effectively solve the problem of metering and controlling the flow in the existing device, can simplify the drug dosing process, can save the drug dosage, and can reduce the cost and management workload of the drug dosing device. The drug dosing device has the advantages and features of easy implementation, safety, reliability, wide application, easy popularization, etc.

To Solve the Above First Technical Problem, the Present Invention Adopts the First Technical Solution:

A drug dosing device for dosage metering and control comprises a drug dosing canister, a first flow channel, a second flow channel, a third flow channel, a metering flow channel, a switch valve, a control valve and a pressure release port;

the upper part or the top of the drug dosing canister communicates with the upper part or the top of the metering flow channel via the first flow channel;

the lower part or the bottom of the drug dosing canister communicates with the lower part or the bottom of the metering flow channel via the second flow channel; the switch valve is disposed on the second flow channel;

the bottom or lower part of the metering flow channel communicates with the control valve via the third flow channel;

the pressure release port is disposed at the upper part or the top of the drug dosing canister; and the cross section area of the metering flow channel is less than the cross section area of the drug dosing canister.

The drug dosing canister is used for storing the functional chemical agent. The drug dosing canister is a closed container, can be made of metal or made of nonmetal, can be a vertical container, a horizontal container, a high pressure container or a medium and low pressure container, and shall meet the safety requirement and the production requirement of the flow channels drug dosing. Based on the means of the prior art, those skilled in the art can determine the concrete structure, form, material, design pressure, effective volume, etc. of the drug dosing canister, can determine the concrete position, connection form and connection method for communicating the upper part or the top of the drug dosing canister with the first flow channel and the pressure release port, can determine the concrete position, connection form and connection method for communicating of the lower part or the bottom of the drug dosing canister with the second flow channel, and can use the prior art to make the drug dosing canister. The first flow channel is used for keeping pressure balance of upper spaces in the drug dosing canister and the metering flow channel. The second flow channel is used for discharging the functional chemical agent and simultaneously used for balancing a liquid level in the drug dosing canister and a liquid level in the metering flow channel. The switch valve can close the second flow channel. The metering flow channel is used for metering the flow through the control valve. In the present invention, to meter the flow of the functional chemical agent through the control valve within a short time, the cross section area of the metering flow channel must be required to be smaller; the cross section area of the metering flow channel shall conform to the requirement that operators can obtain flow data in the metering flow channel within the short time; and as those skilled in the art, the size of the cross section area suitable for metering can be selected as required. The third flow channel is used for communicating with the control valve. The control valve is used for controlling the drug dosing flow and simultaneously is externally connected with a system pipeline needing to be dosed. The pressure release port is used for introducing pressure into the drug dosing canister. The flow resistance of the functional chemical agent from the drug dosing canister, the second flow channel and the switch valve to the control valve shall be basically the same as the flow resistance of the functional chemical agent from the metering flow channel and the third flow channel to the control valve.

Preferably, the flow channel is an abbreviation of a fluid channel, means a channel through which the fluid flows, and can be any one or any combination of at least two of a pipeline, a pipe fitting, a porous channel and a through hole internally provided with a fluid channel.

Preferably, the first flow channel, the second flow channel and the third flow channel are any one or any combination of at least two of a pipeline, a pipe fitting, a porous channel, a through hole, a mechanical component and a mechanical assembly internally provided with fluid channels, are made of metal material or nonmetal material (e.g., high pressure hose), and can be provided with valves, flanges and threads on one end or both ends. The design pressure thereof shall be not less than the design pressure of the drug dosing canister and the metering flow channel. To realize the aforementioned purpose, based on the means of the prior art, those skilled in the art can determine the concrete structures, forms, materials, design pressure and structural forms on both ends of the first flow channel, the second flow channel and the third flow channel, can determine the concrete positions, connection forms and connection methods for communicating both ends of the first flow channel with the upper parts or the tops of the drug dosing canister and the metering flow channel, can determine the concrete positions, connection forms and connection methods for communicating both ends of the second flow channel with the lower parts or the bottoms of the drug dosing canister and the metering flow channel, and can purchase the flow channels from a market or can make the flow channels by using the means of the prior art.

Preferably, the metering flow channel is any one or any combination of at least two of a pipeline, a pipe fitting, a porous channel, a through hole, a mechanical component and a mechanical assembly internally provided with a fluid channel. The metering flow channel can be made of metal or nonmetal material. The top and bottom of the metering flow channel can have the seals such as blind plates, flanges, valves, threads, etc. The metering flow channel shall be installed uprightly or vertically, and shall be capable of directly or indirectly displaying the liquid level of the metering flow channel. The design pressure thereof shall be not less than the design pressure of the drug dosing canister. To realize the aforementioned purpose, based on the means of the prior art, those skilled in the art can determine the concrete structure, form, material and design pressure of the metering flow channel, can determine structural forms, seal forms and seal methods of both ends of the metering flow channel, can determine the concrete connection position, connection form and connection method for communicating the upper part or the top of the metering flow channel with the first flow channel, can determine the concrete connection position, connection form and connection method for communicating the lower part or the bottom of the metering flow channel with the second flow channel, can determine the concrete connection position, connection form and connection method for communicating the bottom or the lower part of the metering flow channel with the third flow channel, can determine a method for measuring or displaying the liquid level of the metering flow channel, and can purchase the flow channel from a market or can make the metering flow channel by using the means of the prior art.

It is known from the common knowledge in the art that: when the inner diameter of an upright metal pipe is not greater than 100 mm, a liquid in the pipe can produce a great flow speed under a gravitational effect and can quickly decrease the liquid level in the metal pipe. Measuring the liquid level of the closed container by using an ultrasonic level gauge is a mature technology in the art. Therefore, the ultrasonic level gauge can accurately measure the liquid level in the upright or vertical metal pipe. When the vertical pipe is made of transparent plastics and quartz, the liquid level can be directly observed.

Preferably, for convenience of metering, the metering flow channel is a glass pipe level gauge, a glass plate type level gauge, a colored quartz tube type level gauge or a sight glass type level gauge.

Preferably, for convenience of metering, the metering flow channel is a magnetic float type level gauge or a magnetic sensitive electronic two-color level gauge made by using a buoyancy principle and a magnetic coupling effect.

Preferably, to realize remote transmission of a metering signal of the liquid level, the metering flow channel is a remote transmission type magnetic float type level gauge which uses a buoyancy principle and a magnetic coupling effect and comprises a sensor, a transmitter and a display.

Preferably, to realize remote transmission of a metering signal of the liquid level, the metering flow channel comprises a flanged housing, a flanged magnetic floating ball level transmitter, an upper interface, a lower interface and a bottom interface, wherein the lower end of the magnetic floating ball level transmitter extends to the lower part in the housing. The metering flow channel can be made of metal or nonmetal. It is known from the common knowledge in the art that: the magnetic floating ball level transmitter can convert the liquid level into a standard electrical signal and perform remote transmission.

Preferably, to realize remote transmission of the metering signal of the liquid level, the metering flow channel comprises a threaded housing, a threaded hydrostatic level transmitter, an upper interface, a lower interface and a bottom interface, wherein the lower end of the hydrostatic level transmitter extends to the lower part in the housing. The metering flow channel can be made of metal or nonmetal. More preferably, the hydrostatic level transmitter can be a magnetostrictive level transmitter. It is known from the common knowledge in the art that: the hydrostatic level transmitter can convert the liquid level into a standard electrical signal and perform remote transmission. When the liquid level can be quickly changed, the hydrostatic level transmitter can effectively meter the liquid level.

Preferably, to realize remote transmission of the metering signal of the liquid level, the metering flow channel comprises a housing, a pressure transmitter, an upper interface, a lower interface and a bottom interface, and the pressure transmitter is disposed on the lower part or the bottom of the housing, all of the above-mentioned can be made of metal or nonmetal. It is known from the common knowledge in the art that: the pressure transmitter can convert the liquid level into a standard electrical signal and perform remote transmission. When the liquid level can be quickly changed, the pressure transmitter can effectively meter the liquid level.

Preferably, to reduce the cost, the metering flow channel comprises a housing, a pressure gauge, an upper interface, a lower interface and a bottom interface, wherein the pressure gauge is disposed on the lower part or the bottom of the housing, and all of the above-mentioned can be made of metal or nonmetal. It is known from the common knowledge in the art that: a linear scale relationship exists between the pressure of a liquid column and the height of the liquid column (i.e., liquid level); and after the reading of the pressure gauge and liquid density (or proportion) are known, a corresponding liquid level can be quickly computed. When the liquid level can quickly change, the pressure gauge can effectively meter the liquid level.

Preferably, to reduce the cost, the metering flow channel comprises a housing, a magnetic float, an upper interface, a lower interface, a bottom interface and colored iron powder, wherein the magnetic float is disposed in the housing and the colored iron powder is disposed outside the housing in a position corresponding to the magnetic float. A working principle is: when the magnetic float is raised or declined with the liquid level, the colored iron powder on the outer wall of the housing is raised or declined therewith, so as to indicate the liquid level.

Preferably, the design pressure of the control valve shall be not less than the design pressure of the metering flow channel and the known valves such as the gate valve, the needle valve, the stop valve, the ball valve, the butterfly valve, etc. can all be applied as control valves. There are numerous connection forms for both ends of the valves, i.e., pipe thread connection, flange connection, slipknot type thread connection, and direct welding or bonding of the valves to the pipeline.

Preferably, the pressure release port is any one or any combination of at least two of a pipeline, a pipe fitting, a porous channel, a through hole, a mechanical component and a mechanical assembly internally provided with a fluid channel, and is made of metal material or nonmetal material (e.g., high pressure hose). The port can have valves, flanges and threads, and the design pressure thereof shall be not less than the design pressure of the drug dosing canister. To realize the above-mentioned purpose, based on the means of the prior art, those skilled in the art can determine the concrete structure, form, material, design pressure and structural form of the port of the pressure release port, can determine the concrete connection position, connection form and connection method for communicating one end of the pressure release port with the drug dosing canister, and can purchase the pressure release port from a market or can use the means of the prior art to make the pressure release port.

Preferably, for convenience of management and conformance with standard requirements for manufacture and use of the pressure container, a safety valve is disposed on the drug dosing canister, and the safety valve is disposed on the top or upper part of the drug dosing canister.

Preferably, a pressure gauge or pressure transmitter is disposed on the drug dosing canister.

Preferably, an emptying interface is disposed on the drug dosing canister, and the emptying interface is disposed on the top or upper part of the drug dosing canister.

Preferably, a sewage draining port is disposed on the drug dosing canister.

Preferably, to regularly supplement the dosage in the drug dosing canister, a drug supplementing interface is disposed on the drug dosing canister.

To Solve the Above First Technical Problem, the Present Invention Adopts the Second Technical Solution:

A drug dosing device for dosage metering and control comprises a drug dosing canister, a first flow channel, a second flow channel, a third flow channel, a metering flow channel, a switch valve, a control valve and a pressure release port;

the upper part or the top of the drug dosing canister communicates with the upper part or the top of the metering flow channel via the first flow channel;

the bottom or the lower part of the metering flow channel communicates with the control valve via the third flow channel;

the lower part or the bottom of the drug dosing canister communicates with third flow channel via the second flow channel, and the switch valve is disposed on the second flow channel;

the pressure release port is disposed at the upper part or top of the drug dosing canister; and the cross section area of the metering flow channel is less than the cross section area of the drug dosing canister.

To Solve the Above First Technical Problem, the Present Invention Adopts the Third Technical Solution:

A drug dosing device for dosage metering and control comprises a drug dosing canister, a baffle plate, a first flow channel, a second flow channel, a third flow channel, a switch valve, a control valve and a pressure release port;

the inner part of the drug dosing canister is divided into a drug storing cavity and a metering cavity by the baffle plate, the upper part of the drug storing cavity communicates with the upper part of the metering cavity via the first flow channel, and the cross section area of the metering cavity is much less than the cross section area of the drug storing cavity;

the bottom of the metering cavity communicates with the control valve via the third flow channel;

the bottom of the drug storing cavity communicates with the third flow channel via the second flow channel, and the switch valve is disposed on the second flow channel; and the pressure release port is disposed at the upper part or the top of the drug dosing canister.

The baffle plate performs the effect of isolating the liquids in the metering cavity and the liquids in the drug storing cavity. The first flow channel performs the effect of balancing the pressure of the metering cavity and the drug storing cavity.

It is known from the common knowledge in the art that: a method for non-contact measurement of the liquid level of the closed container by using a hand-held portable ultrasonic level gauge is a frequently-used technical means in the art, and can be used for quick non-contact measurement of the declined liquid level and the liquid quantity of the liquids in a vertical circular pipe, a square pipe and a rectangular pipe.

Preferably, the metering cavity is a parallel cavity body which is isolated by one baffle plate and is parallel with the drug storing cavity. More preferably, the metering cavity is a sandwich type cavity body which is isolated by more than two baffle plates and sandwiched by the drug storing cavity, the bottom of the cavity body is shared with the bottom or wall of the drug dosing canister, or at least one vertical surface of the cavity body is shared with the wall of the drug dosing canister.

Preferably, the metering cavity is an independent chamber isolated by the baffle plate and disposed in the drug dosing canister.

Preferably, the first flow channel, the second flow channel and the third flow channel are any one or any combination of at least two of a pipeline, a pipe fitting, a porous channel, a through hole, a mechanical component and a mechanical assembly internally provided with fluid channels. The first flow channel performs the effect of balancing the pressure of the metering cavity and the drug storing cavity.

Preferably, the cross section shape of the metering cavity presents a regular geometry, and the cross section area of the metering cavity from top to bottom is identical. The cross section area of the metering cavity shall be capable of meeting the need of quick measurement of the change of the liquid level. To realize the previous purpose, based on the means of the prior art, those skilled in the art can determine the concrete geometry, cross section area and geometrical size of the metering cavity.

Preferably, the cross section of the metering cavity is square, rectangular or round.

Preferably, for convenience of remote transmission of the liquid level of the metering cavity, a pressure transmitter is disposed on the outer wall of the lower part or bottom of the metering cavity. It is known from the common knowledge in the art that: a linear scale relationship exists between pressure of a liquid column and height of the liquid column (i.e., liquid level); and after the readings of the pressure gauge and liquid density (or proportion) are known, a corresponding liquid level can be quickly computed. Therefore, when the liquid level can quickly change, the pressure transmitter can effectively meter the liquid level.

Preferably, for convenience of remote transmission of the liquid level of the metering cavity, a magnetic float transmitter is disposed in the metering cavity of the drug dosing canister; and more preferably, the magnetic float transmitter comprises a baffle plate, a magnetic float, a detection guiding pipe and a transmitter. It is known from the common knowledge in the art that: a method for detecting the liquid level in the closed container by using the magnetic float transmitter is a mature method in the art.

Preferably, for convenience of remote transmission of the liquid level of the metering cavity, a hydrostatic level transmitter is disposed in the metering cavity of the drug dosing canister; and more preferably, the hydrostatic level transmitter is a magnetostrictive level transmitter. It is known from the common knowledge in the art that: a method for detecting the liquid level in the closed container by using the hydrostatic level transmitter is a mature method in the art.

Preferably, to reduce the cost, a pressure gauge is disposed on the outer wall of the lower part or bottom of the metering cavity of the drug dosing canister. It is known from the common knowledge in the art that: a linear scale relationship exists between pressure of a liquid column and height of the liquid column (i.e., liquid level); and after the readings of the pressure gauge and liquid density (or proportion) are known, a corresponding liquid level can be quickly computed. Therefore, when the liquid level can quickly change, the pressure gauge can effectively meter the liquid level.

To Solve the Above Second Technical Problem, the Method for Flow Metering and Control of the Above Device of the Present Invention Comprises the Following Steps:

1) introducing pressure into the drug dosing canister via the pressure release port, and connecting an outlet of the control valve to a system device to be dosed;

2) opening the switch valve and the control valve, and adding functional chemical agents to the system device to be dosed;

3) closing the switch valve, collecting change values of liquid levels in the metering flow channel, and computing the drug dosing flow of the dosage;

4) if the drug dosing flow is too large, turning down the degree of opening of the control valve; then, collecting the change values of the liquid levels in the metering flow channel again; computing the drug dosing flow of the dosage again; judging whether the drug dosing flow satisfies a need; otherwise, if the drug dosing flow is too small, turning up the degree of opening of the control valve; then, collecting the change values of the liquid levels in the metering flow channel again; computing the drug dosing flow of the dosage again; and judging whether the drug dosing flow satisfies the need;

or, adopting the following steps for step 4): if the drug dosing flow is too large, first turning down the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; judging whether the drug dosing flow satisfies the need; otherwise, if the drug dosing flow is too small, first turning up the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; and judging whether the drug dosing flow satisfies the need;

5) repeating step 4) until the drug dosing flow is controlled to a required flow; and 6) opening the switch valve, and adding the drug in the drug dosing canister to the system device to be dosed according to a controlled required drug dosing flow.

Preferably, the method for flow metering and control in a drug dosing process of a gas well in the above device comprises:

1) first communicating the pressure release port on the drug dosing canister with a sleeve valve of the gas well via a pressure release pipeline, and then communicating the control valve with an oil pipe valve of the gas well via a drug dosing pipeline;

2) then opening the switch valve, the control valve, the sleeve valve of the gas well, and the oil pipe valve of the gas well; enabling the functional chemical agents in the drug dosing canister to enter the oil pipe valve successively through the switch valve, the metering flow channel, the control valve and the drug dosing pipeline under the effect of sleeve pressure; and meanwhile, automatically reaching a balance for the liquid levels in the drug dosing canister and the metering flow channel;

3) closing the switch valve, collecting change values of liquid levels in the metering flow channel, and computing the drug dosing flow of the dosage;

4) if the drug dosing flow is too large, turning down the degree of opening of the control valve; then, collecting the change values of the liquid levels in the metering flow channel again; computing the drug dosing flow of the dosage again; judging whether the drug dosing flow satisfies a need; otherwise, if the drug dosing flow is too small, turning up the degree of opening of the control valve; then, collecting the change values of the liquid levels in the metering flow channel again; computing the drug dosing flow of the dosage again; and judging whether the drug dosing flow satisfies the need;

or, adopting the following steps for step 4): if the drug dosing flow is too large, first turning down the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; judging whether the drug dosing flow satisfies the need; otherwise, if the drug dosing flow is too small, first turning up the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; and judging whether the drug dosing flow satisfies the need;

5) repeating step 4) until the drug dosing flow is controlled to a required flow; and 6) opening the switch valve, and adding the drug in the drug dosing canister to the gas well according to a controlled required drug dosing flow.

It is known from the common knowledge in the art that: the gas well is formed by the sleeve and the oil pipe; the pressure of the sleeve of the gas well is inevitably greatly higher than the pressure of the oil pipe of the gas well (sometimes, even greater than 10 MPa); the pressure of the oil pipe of the gas well is inevitably higher than the pressure of the natural gas pipeline; after the drug dosing canister communicates with the sleeve of the gas well via a pressure release pipeline, the pressure in the drug dosing canister is equivalent to the pressure of the sleeve of the gas well and is inevitably higher than the pressure of the oil pipe of the gas well and the natural gas pipeline; and the functional chemical agent in the drug dosing canister can flow into the oil pipe of the gas well and the natural gas pipeline.

Preferably, the method for flow metering and control in a drug dosing process of the natural gas pipeline of a well site in the above device comprises:

1) first communicating the pressure release port on the drug dosing canister with a sleeve valve of a gas well via a pressure release pipeline, and then communicating the control valve with the natural gas pipeline of the well site via a drug dosing pipeline;

2) then opening the switch valve, the control valve and the sleeve valve of the gas well; enabling the functional chemical agents in the drug dosing canister to enter the natural gas pipeline of the well site successively through the switch valve, the metering flow channel, the control valve and the drug dosing pipeline under the effect of sleeve pressure; and meanwhile, automatically reaching a balance for the liquid levels in the drug dosing canister and the metering flow channel;

3) closing the switch valve, collecting change values of liquid levels in the metering flow channel, and computing the drug dosing flow of the dosage;

4) if the drug dosing flow is too large, turning down the degree of opening of the control valve; then, collecting the change values of the liquid levels in the metering flow channel again; computing the drug dosing flow of the dosage again; judging whether the drug dosing flow satisfies a need; otherwise, if the drug dosing flow is too small, turning up the degree of opening of the control valve; then, collecting the change values of the liquid levels in the metering flow channel again; computing the drug dosing flow of the dosage again; and judging whether the drug dosing flow satisfies the need;

or, adopting the following steps for step 4): if the drug dosing flow is too large, first turning down the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; judging whether the drug dosing flow satisfies the need; otherwise, if the drug dosing flow is too small, first turning up the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; and judging whether the drug dosing flow satisfies the need;

5) repeating step 4) until the drug dosing flow is controlled to a required flow; and 6) opening the switch valve, and adding the drug in the drug dosing canister to the natural gas pipeline of the well site according to a controlled required drug dosing flow.

Preferably, the method for flow metering and control in a drug dosing process of the oil pipe of the oil well in the above device comprises:

1) first communicating the pressure release port on the drug dosing canister with a sleeve valve of the oil well via a pressure release pipeline, and then communicating the control valve with the oil pipe of the oil well via a drug dosing pipeline;

2) then opening the switch valve, the control valve, the sleeve valve of the oil well, and the oil pipe valve of the oil well; enabling the functional chemical agents in the drug dosing canister to enter the oil pipe valve of the oil well successively through the switch valve, the metering flow channel, the control valve and the drug dosing pipeline under the effect of sleeve pressure of the oil well; and meanwhile, automatically reaching a balance for the liquid levels in the drug dosing canister and the metering flow channel;

3) closing the switch valve, collecting change values of liquid levels in the metering flow channel, and computing the drug dosing flow of the dosage;

4) if the drug dosing flow is too large, turning down the degree of opening of the control valve; then, collecting the change values of the liquid levels in the metering flow channel again; computing the drug dosing flow of the dosage again; judging whether the drug dosing flow satisfies a need; otherwise, if the drug dosing flow is too small, turning up the degree of opening of the control valve; then, collecting the change values of the liquid levels in the metering flow channel again; computing the drug dosing flow of the dosage again; and judging whether the drug dosing flow satisfies the need;

or, adopting the following steps for step 4): if the drug dosing flow is too large, first turning down the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; judging whether the drug dosing flow satisfies the need; otherwise, if the drug dosing flow is too small, first turning up the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; and judging whether the drug dosing flow satisfies the need;

5) repeating step 4) until the drug dosing flow is controlled to a required flow; and 6) opening the switch valve, and adding the drug in the drug dosing canister to the oil pipe of the oil well according to a controlled required drug dosing flow.

Preferably, a method for flow metering and control in a drug dosing process of an interstation natural gas pipeline (or an outer transportation pipeline of a gas gathering station) in the above device comprises:

1) first communicating the pressure release port on the drug dosing canister with a station incoming pipeline of a gas well via a pressure release pipeline, and then communicating the control valve with the interstation natural gas pipeline (or the outer transportation pipeline of the gas gathering station) via a drug dosing pipeline;

2) then opening the switch valve and the control valve; enabling the functional chemical agents in the drug dosing canister to enter the interstation natural gas pipeline (or the outer transportation pipeline of the gas gathering station) successively through the switch valve, the metering flow channel, the control valve and the drug dosing pipeline under the effect of pressure of the station incoming pipeline of the gas well; and meanwhile, automatically reaching a balance for the liquid levels in the drug dosing canister and the metering flow channel;

3) closing the switch valve, collecting change values of liquid levels in the metering flow channel, and computing the drug dosing flow of the dosage;

4) if the drug dosing flow is too large, turning down the degree of opening of the control valve; then, collecting the change values of the liquid levels in the metering flow channel again; computing the drug dosing flow of the dosage again; judging whether the drug dosing flow satisfies a need; otherwise, if the drug dosing flow is too small, turning up the degree of opening of the control valve; then, collecting the change values of the liquid levels in the metering flow channel again; computing the drug dosing flow of the dosage again; and judging whether the drug dosing flow satisfies the need;

or, adopting the following steps for step 4): if the drug dosing flow is too large, first turning down the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; judging whether the drug dosing flow satisfies the need; otherwise, if the drug dosing flow is too small, first turning up the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; and judging whether the drug dosing flow satisfies the need;

5) repeating step 4) until the drug dosing flow is controlled to a required flow; and 6) opening the switch valve, and adding the drug in the drug dosing canister to the interstation natural gas pipeline (or the outer transportation pipeline of the gas gathering station) according to a controlled required drug dosing flow.

Preferably, the method for flow metering and control in a drug dosing process of the natural gas pipeline of a well site in the above device comprises:

1) first elevating the bottom of the drug dosing canister to be greater than the height of the oil pipe valve of a gas production tree; then communicating the pressure release port on the drug dosing canister with a natural gas pipeline on one side of the gas production tree via a pressure release pipeline; and communicating the control valve with an oil pipe valve on the other side of the gas production tree via a drug dosing pipeline;

2) then opening the switch valve, the control valve and the oil pipe valve; enabling the functional chemical agents in the drug dosing canister to enter the natural gas pipeline of the well site successively through the switch valve, the metering flow channel, the control valve, the drug dosing pipeline, the oil pipe valve and an upper four-way valve under a gravitational effect; and meanwhile, automatically reaching a balance for the liquid levels in the drug dosing canister and the metering flow channel;

3) closing the switch valve, collecting change values of liquid levels in the metering flow channel, and computing the drug dosing flow of the dosage;

4) if the drug dosing flow is too large, turning down the degree of opening of the control valve; then, collecting the change values of the liquid levels in the metering flow channel again; computing the drug dosing flow of the dosage again; judging whether the drug dosing flow satisfies a need; otherwise, if the drug dosing flow is too small, turning up the degree of opening of the control valve; then, collecting the change values of the liquid levels in the metering flow channel again; computing the drug dosing flow of the dosage again; and judging whether the drug dosing flow satisfies the need;

or, adopting the following steps for step 4): if the drug dosing flow is too large, first turning down the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; judging whether the drug dosing flow satisfies the need; otherwise, if the drug dosing flow is too small, first turning up the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; and judging whether the drug dosing flow satisfies the need;

5) repeating step 4) until the drug dosing flow is controlled to a required flow; and 6) opening the switch valve, and adding the drug in the drug dosing canister to the natural gas pipeline of the well site according to a controlled required drug dosing flow.

It is known from the common knowledge in the art that: drug dosing to the natural gas pipeline on the other side via the valves of the oil pipe and the upper four-way valve on one side of the gas production tree is a frequently-used method.

Preferably, the method for flow metering and control in a drug dosing process of a sleeve of the gas well in the above device comprises:

1) first elevating the bottom of the drug dosing canister to be greater than the height of a sleeve valve of a gas production tree; then communicating the pressure release port on the drug dosing canister with the sleeve valve of the gas well on one side of the gas production tree via a pressure release pipeline; and communicating the control valve with the sleeve valve of the gas well on the other side of the gas production tree via a drug dosing pipeline;

2) then opening the switch valve, the control valve and the sleeve valve of the gas well; enabling the functional chemical agents in the drug dosing canister to enter the sleeve of the gas well successively through the switch valve, the metering flow channel, the control valve and the drug dosing pipeline under a gravitational effect; and meanwhile, automatically reaching a balance for the liquid levels in the drug dosing canister and the metering flow channel;

3) closing the switch valve, collecting change values of liquid levels in the metering flow channel, and computing the drug dosing flow of the dosage;

4) if the drug dosing flow is too large, turning down the degree of opening of the control valve; then, collecting the change values of the liquid levels in the metering flow channel again; computing the drug dosing flow of the dosage again; judging whether the drug dosing flow satisfies a need; otherwise, if the drug dosing flow is too small, turning up the degree of opening of the control valve; then, collecting the change values of the liquid levels in the metering flow channel again; computing the drug dosing flow of the dosage again; and judging whether the drug dosing flow satisfies the need;

or, adopting the following steps for step 4): if the drug dosing flow is too large, first turning down the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; judging whether the drug dosing flow satisfies the need; otherwise, if the drug dosing flow is too small, first turning up the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; and judging whether the drug dosing flow satisfies the need;

5) repeating step 4) until the drug dosing flow is controlled to a required flow; and 6) opening the switch valve, and adding the drug in the drug dosing canister to the sleeve of the gas well according to a controlled required drug dosing flow.

Preferably, the method for flow metering and control in a drug dosing process of the oil pipe of the gas well in the above device comprises:

1) first elevating the bottom of the drug dosing canister to be greater than the height of an oil pipe valve of a gas production tree; then communicating the pressure release port on the drug dosing canister with an oil pipe of the gas well on one side of the gas production tree via a pressure release pipeline; and communicating the control valve with the same oil pipe of the gas well via a drug dosing pipeline;

2) then opening the switch valve, the control valve and the oil pipe valve of the gas well; enabling the functional chemical agents in the drug dosing canister to enter the oil pipe of the gas well successively through the switch valve, the metering flow channel, the control valve and the drug dosing pipeline under a gravitational effect; and meanwhile, automatically reaching a balance for the liquid levels in the drug dosing canister and the metering flow channel;

3) closing the switch valve, collecting change values of liquid levels in the metering flow channel, and computing the drug dosing flow of the dosage;

4) if the drug dosing flow is too large, turning down the degree of opening of the control valve; then, collecting the change values of the liquid levels in the metering flow channel again; computing the drug dosing flow of the dosage again; judging whether the drug dosing flow satisfies a need; otherwise, if the drug dosing flow is too small, turning up the degree of opening of the control valve; then, collecting the change values of the liquid levels in the metering flow channel again; computing the drug dosing flow of the dosage again; and judging whether the drug dosing flow satisfies the need;

or, adopting the following steps for step 4): if the drug dosing flow is too large, first turning down the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; judging whether the drug dosing flow satisfies the need; otherwise, if the drug dosing flow is too small, first turning up the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; and judging whether the drug dosing flow satisfies the need;

5) repeating step 4) until the drug dosing flow is controlled to a required flow; and 6) opening the switch valve, and adding the drug in the drug dosing canister to the oil pipe of the gas well according to a controlled required drug dosing flow.

Preferably, the method for flow metering and control in a drug dosing process of the sleeve of the oil well in the above device comprises:

1) first elevating the bottom of the drug dosing canister to be greater than the height of a sleeve valve of an oil production tree; then communicating the pressure release port on the drug dosing canister with the sleeve valve of the oil well on one side of the oil production tree via a pressure release pipeline; and communicating the control valve with the sleeve valve of the oil well on the other side of the oil production tree via a drug dosing pipeline;

2) then opening the switch valve, the control valve and the sleeve valve of the oil well; enabling the functional chemical agents in the drug dosing canister to enter the oil well sleeve successively through the switch valve, the metering flow channel, the control valve and the drug dosing pipeline under a gravitational effect; and meanwhile, automatically reaching a balance for the liquid levels in the drug dosing canister and the metering flow channel;

3) closing the switch valve, collecting change values of liquid levels in the metering flow channel, and computing the drug dosing flow of the dosage;

4) if the drug dosing flow is too large, turning down the degree of opening of the control valve; then, collecting the change values of the liquid levels in the metering flow channel again; computing the drug dosing flow of the dosage again; judging whether the drug dosing flow satisfies a need; otherwise, if the drug dosing flow is too small, turning up the degree of opening of the control valve; then, collecting the change values of the liquid levels in the metering flow channel again; computing the drug dosing flow of the dosage again; and judging whether the drug dosing flow satisfies the need;

or, adopting the following steps for step 4): if the drug dosing flow is too large, first turning down the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; judging whether the drug dosing flow satisfies the need; otherwise, if the drug dosing flow is too small, first turning up the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; and judging whether the drug dosing flow satisfies the need;

5) repeating step 4) until the drug dosing flow is controlled to a required flow; and 6) opening the switch valve, and adding the drug in the drug dosing canister to the oil well sleeve according to a controlled required drug dosing flow.

Preferably, the method for flow metering and control in a drug dosing process of a liquid flow channel in the above device comprises:

1) first communicating the pressure release port on the drug dosing canister with a compressed gas source via a pressure release pipeline, and then communicating the control valve with the liquid flow channel via a drug dosing pipeline;

2) then opening the switch valve and the control valve; enabling the functional chemical agents in the drug dosing canister to enter the liquid flow channel successively through the switch valve, the metering flow channel, the control valve and the drug dosing pipeline under the effect of pressure of the compressed gas source; and meanwhile, automatically reaching a balance for the liquid levels in the drug dosing canister and the metering flow channel;

3) closing the switch valve, collecting change values of liquid levels in the metering flow channel, and computing the drug dosing flow of the dosage;

4) if the drug dosing flow is too large, turning down the degree of opening of the control valve; then, collecting the change values of the liquid levels in the metering flow channel again; computing the drug dosing flow of the dosage again; judging whether the drug dosing flow satisfies a need; otherwise, if the drug dosing flow is too small, turning up the degree of opening of the control valve; then, collecting the change values of the liquid levels in the metering flow channel again; computing the drug dosing flow of the dosage again; and judging whether the drug dosing flow satisfies the need;

or, adopting the following steps for step 4): if the drug dosing flow is too large, first turning down the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; judging whether the drug dosing flow satisfies the need; otherwise, if the drug dosing flow is too small, first turning up the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; and judging whether the drug dosing flow satisfies the need;

5) repeating step 4) until the drug dosing flow is controlled to a required flow; and 6) opening the switch valve, and adding the drug in the drug dosing canister to the liquid flow channel according to a controlled required drug dosing flow.

Preferably, the compressed gas source can be any one of a nitrogen gas bottle, a liquefied gas bottle, an oxygen gas bottle, an acetylene bottle, a carbon dioxide gas canister, a compressed natural gas canister (e.g., CNG), instrument air, an air compressor, a pressure fan, a gas pump, a mobile compressed gas source, liquid nitrogen, liquid carbon dioxide and liquefied gas (e.g., LNG).

Preferably, a method for flow metering and control in a drug dosing process of an interstation natural gas pipeline (or an outer transportation pipeline of a gas gathering station) in the above device comprises:

1) first elevating the bottom of the drug dosing canister to be greater than the height of the interstation natural gas pipeline (or the outer transportation pipeline of the gas gathering station); then communicating the pressure release port on the drug dosing canister with the interstation natural gas pipeline (or the outer transportation pipeline of the gas gathering station) via a pressure release pipeline; and communicating the control valve with the interstation natural gas pipeline (or the outer transportation pipeline of the gas gathering station) via a drug dosing pipeline;

2) then opening the switch valve and the control valve; enabling the functional chemical agents in the drug dosing canister to enter the interstation natural gas pipeline (or the outer transportation pipeline of the gas gathering station) successively through the switch valve, the metering flow channel, the control valve and the drug dosing pipeline under a gravitational effect; and meanwhile, automatically reaching a balance for the liquid levels in the drug dosing canister and the metering flow channel;

3) closing the switch valve, collecting change values of liquid levels in the metering flow channel, and computing the drug dosing flow of the dosage;

4) if the drug dosing flow is too large, turning down the degree of opening of the control valve; then, collecting the change values of the liquid levels in the metering flow channel again; computing the drug dosing flow of the dosage again; judging whether the drug dosing flow satisfies a need; otherwise, if the drug dosing flow is too small, turning up the degree of opening of the control valve; then, collecting the change values of the liquid levels in the metering flow channel again; computing the drug dosing flow of the dosage again; and judging whether the drug dosing flow satisfies the need;

or, adopting the following steps for step 4): if the drug dosing flow is too large, first turning down the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; judging whether the drug dosing flow satisfies the need; otherwise, if the drug dosing flow is too small, first turning up the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; and judging whether the drug dosing flow satisfies the need;

5) repeating step 4) until the drug dosing flow is controlled to a required flow; and 6) opening the switch valve, and adding the drug in the drug dosing canister to the interstation natural gas pipeline (or the outer transportation pipeline of the gas gathering station) according to a controlled required drug dosing flow.

To Solve the Above Second Technical Problem, the Method for Flow Metering and Control of the Above Device of the Present Invention Comprises the Following Steps:

1) introducing pressure into the drug storing cavity and the metering cavity via the pressure release port, and connecting an outlet of the control valve to a system device to be dosed;

2) opening the switch valve and the control valve; adding functional chemical agents to the system device to be dosed; and meanwhile, automatically reaching a balance for the liquid level in the metering cavity and the liquid level in the liquid storing cavity;

3) closing the switch valve, collecting change values of liquid levels in the metering cavity, and computing the drug dosing flow of the dosage;

4) if the drug dosing flow is too large, turning down the degree of opening of the control valve; then, collecting the change values of the liquid levels in the metering flow channel again; computing the drug dosing flow of the dosage again; judging whether the drug dosing flow satisfies a need; otherwise, if the drug dosing flow is too small, turning up the degree of opening of the control valve; then, collecting the change values of the liquid levels in the metering flow channel again; computing the drug dosing flow of the dosage again; and judging whether the drug dosing flow satisfies the need;

or, adopting the following steps for step 4): if the drug dosing flow is too large, first turning down the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; judging whether the drug dosing flow satisfies the need; otherwise, if the drug dosing flow is too small, first turning up the degree of opening of the control valve; then opening the switch valve until a liquid level in the metering flow channel and a liquid level in the drug dosing canister are balanced; then closing the switch valve; collecting the change values of the liquid levels in the metering flow channel; computing the drug dosing flow of the dosage; and judging whether the drug dosing flow satisfies the need;

5) repeating step 4) until the drug dosing flow is controlled to a required flow; and 6) opening the switch valve, and adding the drug in the drug dosing canister to the system device to be dosed according to a controlled required drug dosing flow.

The present invention has the following beneficial effects: the present invention overcomes the defect of the existing drug dosing device, can effectively solve the problem of metering and controlling the drug dosing flow of the existing drug dosing device and drug dosing method, can simplify the drug dosing device and drug dosing process, can save drug dosage, and can reduce the cost and management workload of the drug dosing device. The present invention has the advantages and features of easy implementation, safety, reliability, wide application, easy popularization, etc.

DESCRIPTION OF THE DRAWINGS

The specific embodiments of the present invention will be further described below in detail in conjunction with the accompanying drawings.

DETAILED DESCRIPTION

Embodiment 1

Figure 1:
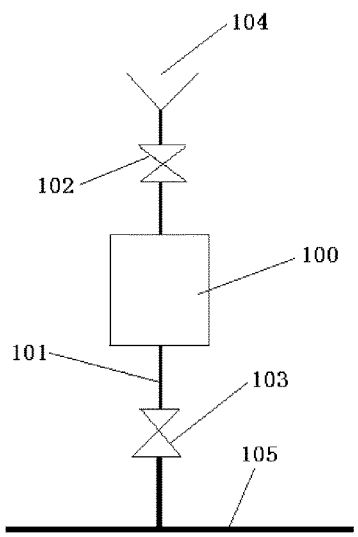
FIG. 1 is a structural diagram of a drug dosing device used in the existing periodic drug dosing method of a small drug dosing canister.
Figure 2:
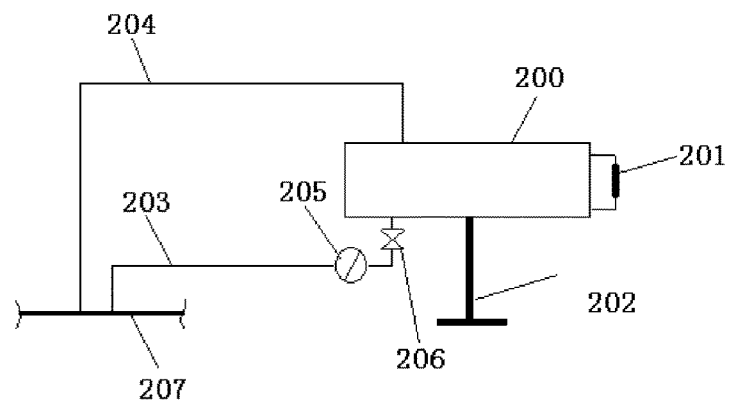
FIG. 2 is a structural diagram of a drug dosing device used in a continuous drug dosing method of the existing balance type drug dosing canister.
Figure 3:
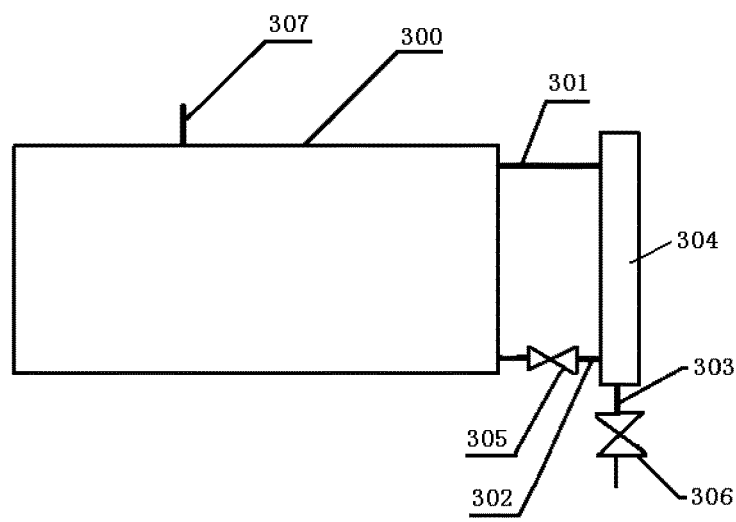
FIG. 3 is a structural diagram of a drug dosing device in embodiment 1.

As shown in FIG. 3, a drug dosing device for dosage metering and control comprises a drug dosing canister 300, a first flow channel 301, a second flow channel 302, a third flow channel 303, a metering flow channel 304, a switch valve 305, a control valve 306 and a pressure release port 307;

the upper part of the drug dosing canister 300 communicates with the upper part of the metering flow channel 304 via the first flow channel 301;

the lower part of the drug dosing canister 300 communicates with the lower part of the metering flow channel 304 via the second flow channel 302; the switch valve 305 is disposed on the second flow channel 302;

the bottom of the metering flow channel 304 communicates with the control valve 306 via the third flow channel 303;

the first flow channel 301, the second flow channel 302 and the third flow channel 303 are selected from stainless steel communicating pipes with a diameter of 5 mm, pressure resistance of 32 MPa and flanges on both ends;

the pressure release port 307 is disposed at the top of the drug dosing canister 300;

the drug dosing canister 300 is a horizontal high pressure canister, the canister body has a diameter of 400 mm, a length of 2000 mm and a design pressure of 32 MPa, and both ends are sealed with welding seal heads;

the metering flow channel 304 is a hollow pipe and is made of stainless steel; the metering flow channel 304 has an inner diameter of 20 mm, a length of 1000 mm and a design pressure of 32 MPa, and the upper end and the lower end are welded and sealed; a 50 mm of stainless steel short pipe is welded on the side surface of the upper part of the metering flow channel 304 at a distance of 50 mm from the top, and used for connecting the first flow channel 301; a 50 mm of stainless steel short pipe is welded on the side surface of the lower part of the metering flow channel 304 at a distance of 100 mm from the bottom, and used for connecting the second flow channel 302; a 50 mm of stainless steel short pipe is welded on the bottom of the metering flow channel 304, and used for connecting the third flow channel 303; and the flowing resistance of the functional chemical agent from the drug dosing canister 300, the second flow channel 302 and the switch valve 305 to the control valve 306 shall be almost the same as the flowing resistance from the metering flow channel 304 and the third flow channel 303 to the control valve 306.

Computed according to the above example data, the cross section area of the metering flow channel is much less than the horizontal cross section area of the drug dosing canister (about less than 2000 times), and the purpose of metering and controlling the drug dosing flow can be satisfied within the short time.

Embodiment 2

Embodiment 1 is repeated, and the difference is that: the metering flow channel 304 is a glass pipe level gauge, a glass plate type level gauge, a colored quartz tube type level gauge or a sight glass type level gauge.

Embodiment 3

Embodiment 1 is repeated, and the difference is that: the metering flow channel 304 is a magnetic float type level gauge or a magnetic sensitive electronic two-color level gauge made by using a buoyancy principle and a magnetic coupling effect.

Embodiment 4

Embodiment 1 is repeated, and the difference is that: the metering flow channel 304 is a remote transmission type magnetic float type level gauge which uses a buoyancy principle and a magnetic coupling effect and comprises a sensor, a transmitter and a display.

Embodiment 5

Figure 4:
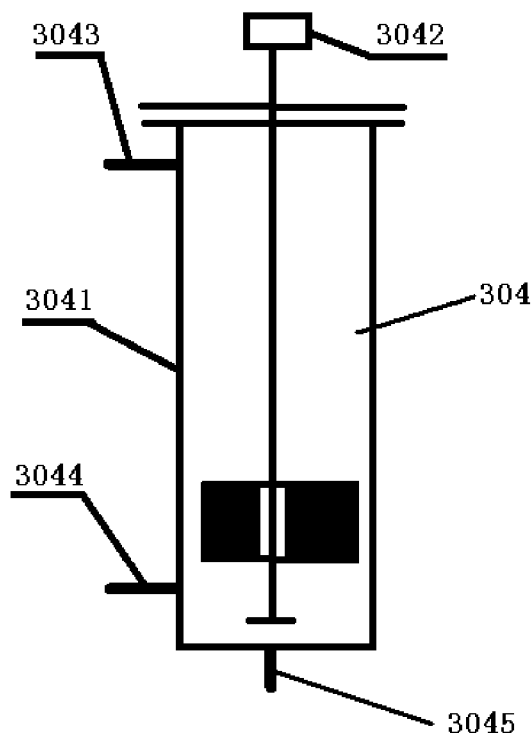
FIG. 4 is a structural diagram of a metering flow channel in embodiment 5.

As shown in FIG. 4, embodiment 1 is repeated, and the difference is that: the metering flow channel 304 comprises a flanged housing 3041, a flanged magnetic floating ball level transmitter 3042, an upper interface 3043, a lower interface 3044 and a bottom interface 3045, wherein the lower end of the magnetic floating ball level transmitter 3042 extends to the lower part in the housing 3041 and the upper end of the magnetic floating ball level transmitter 3042 is connected with the top flange of the housing 3041. The magnetic floating ball level transmitter 3042 can convert the liquid level into a standard electrical signal and perform remote transmission.

Embodiment 6

Figure 5:
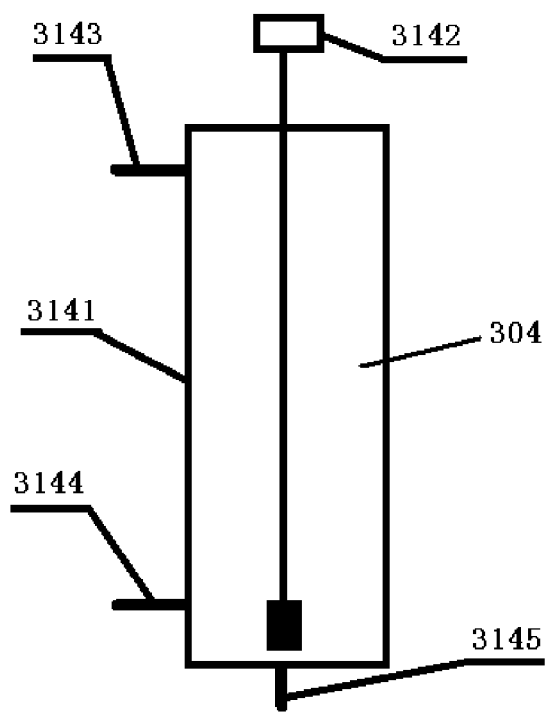
FIG. 5 is a structural diagram of a metering flow channel in embodiment 6.

As shown in FIG. 5, embodiment 1 is repeated, and the difference is that: the metering flow channel 304 comprises a threaded housing 3141, a threaded hydrostatic level transmitter 3142, an upper interface 3143, a lower interface 3144 and a bottom interface 3145, wherein the lower end of the hydrostatic level transmitter 3142 extends to the lower part in the housing 3141 and upper part of the hydrostatic level transmitter 3142 and the top of the housing 3141 are in thread connection. The hydrostatic level transmitter 3142 is a magnetostrictive level transmitter. The hydrostatic level transmitter 3142 can convert the liquid level into a standard electrical signal and perform remote transmission. When the liquid level can be quickly changed, the hydrostatic level transmitter 3142 can effectively meter the liquid level.

Embodiment 7

Figure 6:
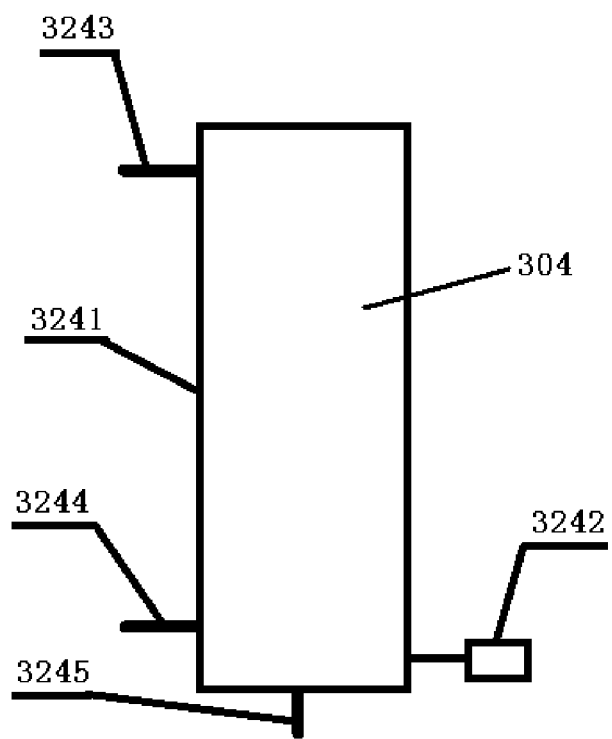
FIG. 6 is a structural diagram of a metering flow channel in embodiment 7.

As shown in FIG. 6, embodiment 1 is repeated, and the difference is that: the metering flow channel 304 comprises a housing 3241, a pressure transmitter 3242, an upper interface 3243, a lower interface 3244 and a bottom interface 3245, wherein the pressure transmitter 3242 is disposed on the lower part of the housing 3241. The pressure transmitter 3242 can convert the liquid level into a standard electrical signal and perform remote transmission. When the liquid level can be quickly changed, the pressure transmitter 3242 can effectively meter the liquid level.

Embodiment 8

Figure 7:
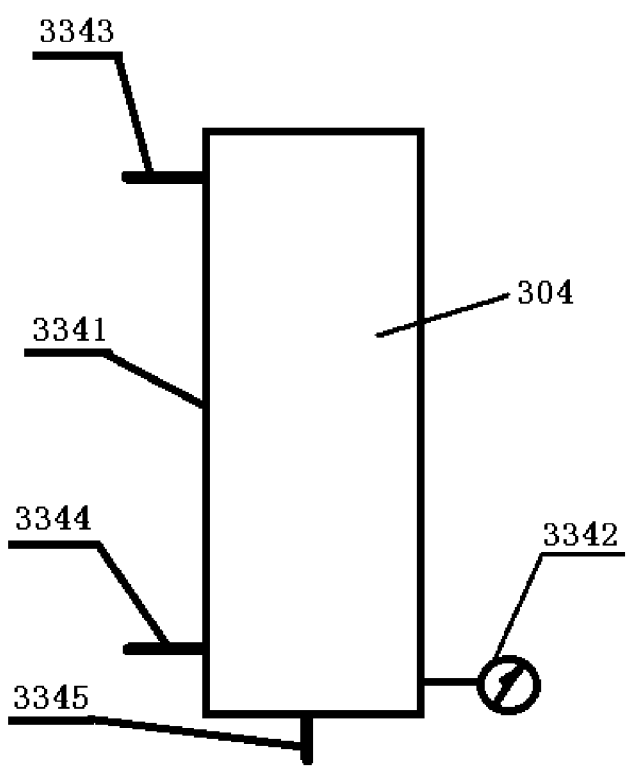
FIG. 7 is a structural diagram of a metering flow channel in embodiment 8.

As shown in FIG. 7, embodiment 1 is repeated, and the difference is that: the metering flow channel 304 comprises a housing 3341, a pressure gauge 3342, an upper interface 3343, a lower interface 3344 and a bottom interface 3345, wherein the pressure gauge 3342 is disposed on the lower part of the housing 3341. After the readings of the pressure gauge 3342 and liquid density (or proportion) are known, a corresponding liquid level can be quickly computed. When the liquid level can be quickly changed, the pressure gauge 3342 can effectively meter the liquid level.

Embodiment 9

Figure 8:
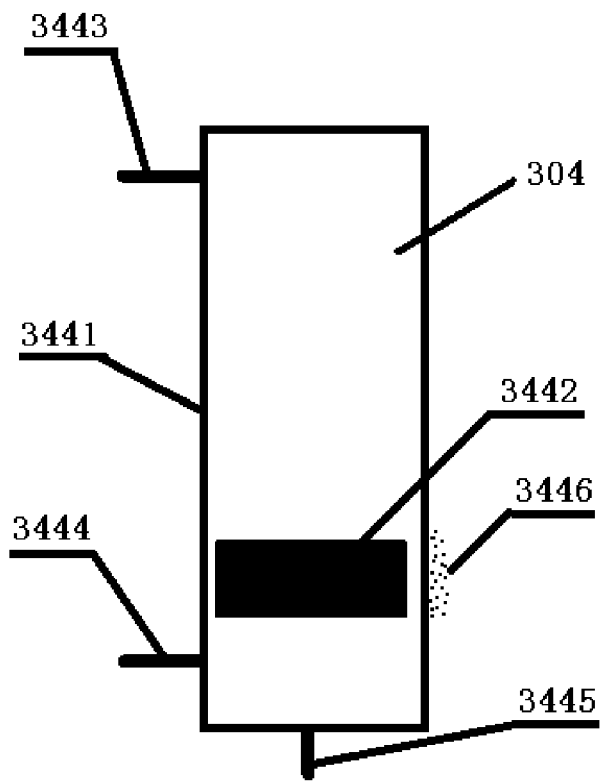
FIG. 8 is a structural diagram of a metering flow channel in embodiment 9.

As shown in FIG. 8, embodiment 1 is repeated, and the difference is that: the metering flow channel 304 comprises a housing 3441, a magnetic float 3442, an upper interface 3443, a lower interface 3444, a bottom interface 3445 and colored iron powder 3446, wherein the magnetic float 3442 is disposed in the housing 3441 and the colored iron powder 3446 is disposed on the outer wall of the housing 3441 in a position corresponding to the magnetic float 3442. A working principle is: when the magnetic float 3442 is raised or declined with the liquid level, the colored iron powder 3446 on the outer wall of the housing 3441 is raised or declined therewith, so as to indicate the liquid level.

Embodiment 10

Figure 9:
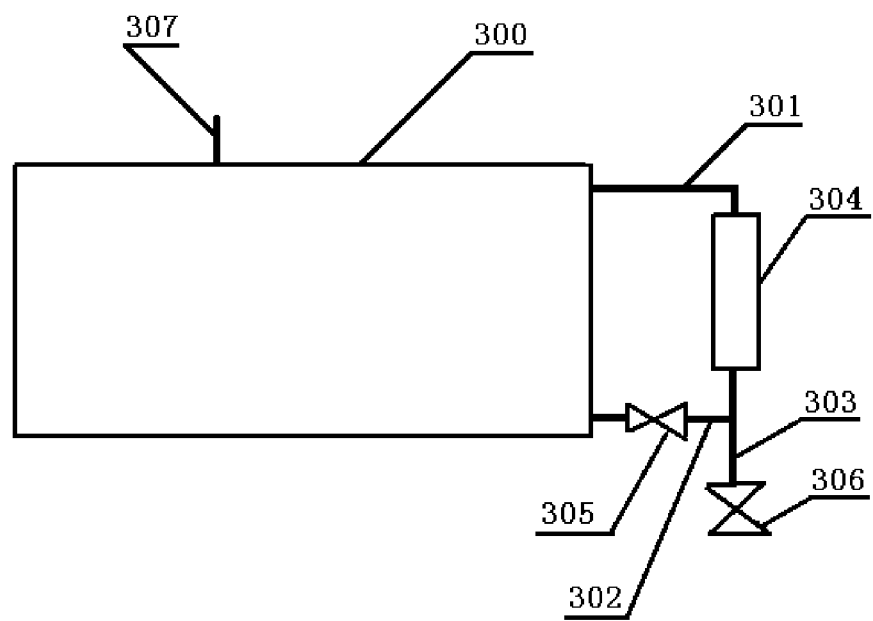
FIG. 9 is a structural diagram of a drug dosing device in embodiment 10.

As shown in FIG. 9, a drug dosing device for dosage metering and control comprises a drug dosing canister 300, a first flow channel 301, a second flow channel 302, a third flow channel 303, a metering flow channel 304, a switch valve 305, a control valve 306 and a pressure release port 307;

the upper part of the drug dosing canister 300 communicates with the top of the metering flow channel 304 via the first flow channel 301;

the bottom of the metering flow channel 304 communicates with the control valve 306 via the third flow channel 303;

the lower part of the drug dosing canister 300 communicates with the third flow channel 303 via the second flow channel 302; a three-way connection mode is formed at the connection place of the second flow channel 302 and the third flow channel 303; the switch valve 305 is disposed on the second flow channel 302;

the first flow channel 301, the second flow channel 302 and the third flow channel 303 are selected from stainless steel communicating pipes with a diameter of 25 mm, pressure resistance of 10 MPa and flanges on both ends;

the pressure release port 307 is disposed at the top of the drug dosing canister 300;

the drug dosing canister 300 is a horizontal medium pressure canister, the canister body has a diameter of 2000 mm, a length of 4000 mm and a design pressure of 3 MPa, and both ends are sealed with welding seal heads;

the metering flow channel 304 is a hollow pipe and is made of transparent plastics; the metering flow channel 304 has an inner diameter of 10 mm, a length of 1000 mm and a design pressure of 5 MPa, and the upper end and the lower end are welded and sealed; a 50 mm of plastic short pipe is bonded on the side surface of the upper part of the metering flow channel 304 at a distance of 50 mm from the top, and used for connecting the first flow channel 301; a 50 mm of plastic short pipe is bonded on the side surface of the lower part of the metering flow channel 304 at a distance of 100 mm from the bottom, and used for connecting the second flow channel 302; a 50 mm of plastic short pipe is bonded on the bottom of the metering flow channel 304, and used for connecting the third flow channel 303.

Computed according to the above example data, the cross section area of the metering flow channel is much less than the cross section area of the drug dosing canister (about less than 80000 times), and the purpose of metering and controlling the drug dosage can be satisfied within the short time.

Embodiment 11

Figure 10:
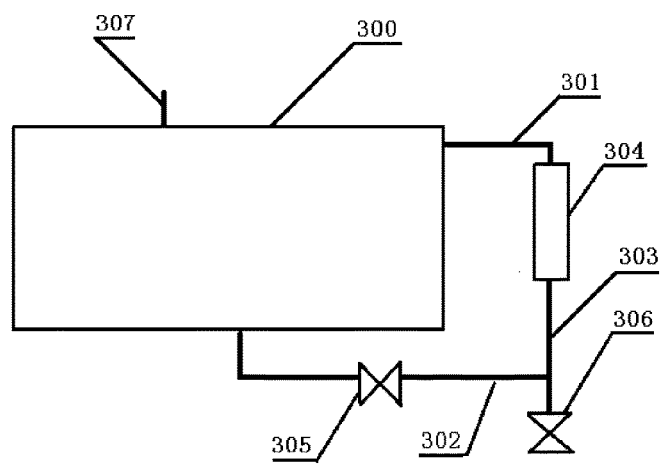
FIG. 10 is a structural diagram of a drug dosing device in embodiment 11.

As shown in FIG. 10, embodiment 10 is repeated, and the difference is that: the bottom of the drug dosing canister 300 communicates with the third flow channel 303 via the second flow channel 302.

Embodiment 12

Figure 11:
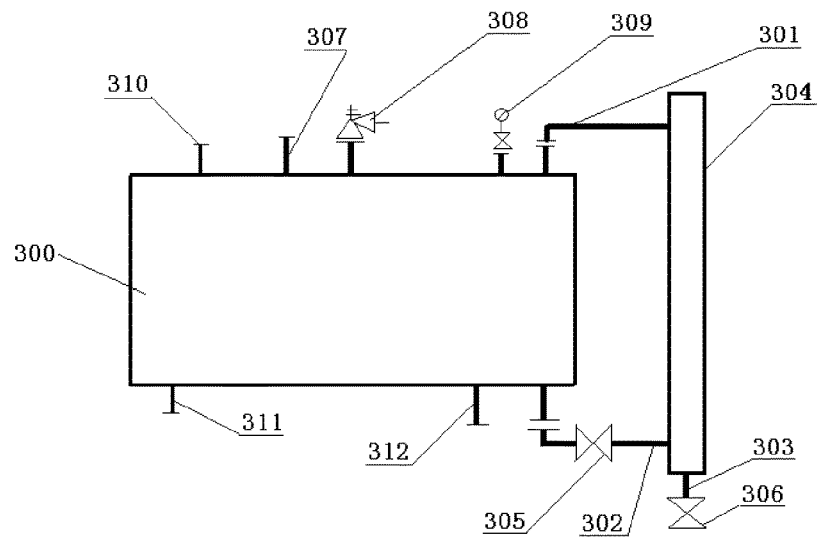
FIG. 11 is a structural diagram of a drug dosing device in embodiment 12.

As shown in FIG. 11, a drug dosing device for dosage metering and control comprises a drug dosing canister 300, a first flow channel 301, a second flow channel 302, a third flow channel 303, a metering flow channel 304, a switch valve 305, a control valve 306 and a pressure release port 307;

the top of the drug dosing canister 300 communicates with the upper part of the metering flow channel 304 via the first flow channel 301;

the bottom of the metering flow channel 304 communicates with the control valve 306 via the third flow channel 303;

the bottom of the drug dosing canister 300 communicates with the lower part of the metering flow channel 304 via the second flow channel 302; the switch valve 305 is disposed on the second flow channel 302;

the first flow channel 301, the second flow channel 302 and the third flow channel 303 are selected from stainless steel communicating pipes with a diameter of 10 mm, pressure resistance of 5 MPa and flanges on both ends;

the pressure release port 307 is disposed at the top of the drug dosing canister 300;

the drug dosing canister 300 is a horizontal low pressure canister, the canister body has a diameter of 1000 mm, a length of 2500 mm and a design pressure of 1 MPa, and both ends are sealed with welding seal heads;

the metering flow channel 304 is a stainless steel hollow pipe, and has an inner diameter of 15 mm, a length of 1800 mm and a design pressure of 1 MPa; a 50 mm of stainless steel short pipe is welded on the side surface of the upper part of the metering flow channel 304 at a distance of 50 mm from the top, and used for connecting the first flow channel 301; a 50 mm of stainless steel short pipe is welded on the side surface of the lower part of the metering flow channel 304 at a distance of 100 mm from the bottom, and used for connecting the second flow channel 302; a 50 mm of stainless steel short pipe is welded on the bottom of the metering flow channel 304, and used for connecting the third flow channel 303; and computed according to the above example data, the cross section area of the metering flow channel is much less than the horizontal cross section area of the drug dosing canister (about less than 10000 times), and the purpose of metering and controlling the drug dosage can be satisfied within the short time.

The safety valve 308 is disposed at the top of the drug dosing canister 300;

the pressure gauge 309 is disposed at the top of the drug dosing canister 300;

the emptying interface 310 is disposed at the top of the drug dosing canister 300;

the sewage draining port 311 is disposed at the bottom of the drug dosing canister 300;

and the drug supplementing interface 312 is disposed on the drug dosing canister 300.

Embodiment 13

Figure 12:
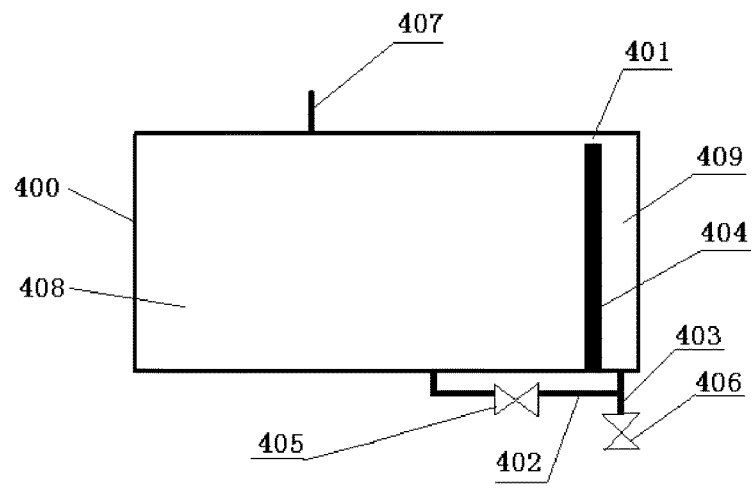
FIG. 12 is a structural diagram of a drug dosing device in embodiment 13.

As shown in FIG. 12, a drug dosing device for dosage metering and control comprises a drug dosing canister 400, a first flow channel 401, a second flow channel 402, a third flow channel 403, a baffle plate 404, a switch valve 405, a control valve 406 and a pressure release port 407;

in the embodiment, the drug dosing canister 300 is a horizontal low pressure rectangular canister, the canister body has a length of 2500 mm, a width of 1000 mm, a height of 1000 mm and a design pressure of 1 MPa;

the inner part of the drug dosing canister 400 is divided by one baffle plate 404 into a drug storing cavity 408 and a metering cavity 409 which are parallel; and the cross section of the metering cavity 409 from top to bottom presents a rectangle of 10 mm×1000 mm. Computed according to the above data, the cross section area of the metering cavity 409 is much less than the cross section area of the drug storing cavity 408 (about 250 times), and the purpose of metering and controlling the drug dosage can be satisfied within the short time.

The upper part of the drug storing cavity 408 communicates with the upper part of the metering cavity 409 via the first flow channel 401; in the embodiment, the first flow channel 401 is a porous channel disposed on the baffle plate;

the bottom of the metering cavity 409 communicates with the control valve 406 via the third flow channel 403;

the bottom of the drug storing cavity 408 communicates with the third flow channel 3403 via the second flow channel 402; the switch valve 405 is disposed on the second flow channel 402;

and the pressure release port 407 is disposed at the top of the drug dosing canister 400.

The technical solution of the embodiment is only a simple deformation compared with the technical solutions of embodiments 1-12, and essentially is the integral arrangement of the drug dosing canister and the metering flow channel. By arranging the baffle plate, the function and the effect of the drug storing cavity are identical with those of the drug dosing canister in the above embodiments, and the function and the effect of the metering cavity are identical with those of the metering flow channel in the above embodiments.

Embodiment 14

Figure 13:
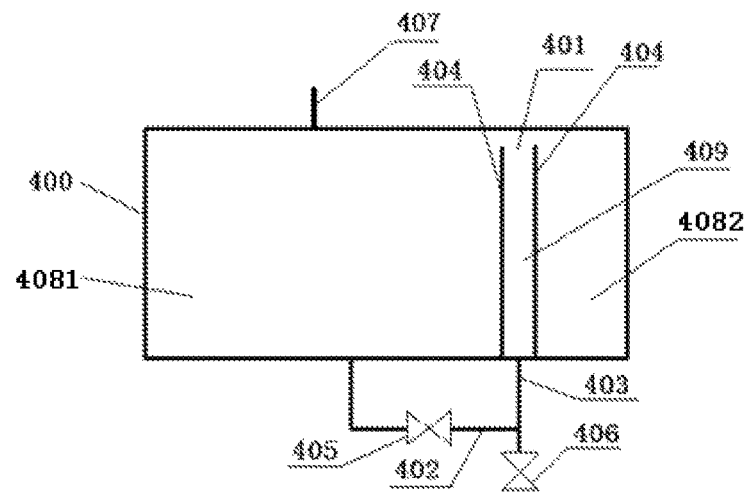
FIG. 13 is a structural diagram of a drug dosing device in embodiment 14.

As shown in FIG. 13, embodiment 13 is repeated, and the difference is that:

the drug dosing canister 300 is a horizontal high pressure canister, the canister body has a diameter of 500 mm, a length of 2500 mm and a design pressure of 25 MPa, and both ends are sealed with welding seal heads;

the inner part of the drug dosing canister 400 is divided by two baffle plates 404 into a drug storing cavity 408 and a metering cavity 409, and a spacing between the two baffle plates is 10 mm;

the metering cavity 409 is sandwiched by a left drug storing cavity 4081 and a right drug storing cavity 4082, and the bottom of the cavity body is part of the outer wall of the bottom of the drug dosing canister, i.e., the bottom of the cavity body is shared with the outer wall of the bottom of the drug dosing canister;

and the cross section of the metering cavity 409 from top to bottom presents a rectangle, i.e., a rectangle having the maximum cross section area of 500 mm×10 mm. Computed according to the above data, the maximum cross section area of the metering cavity 409 is much less than the maximum cross section area of the drug storing cavity 408 (about 250 times), and the purpose of metering and controlling the drug dosage can be satisfied within the short time.

Embodiment 15

Figure 14:
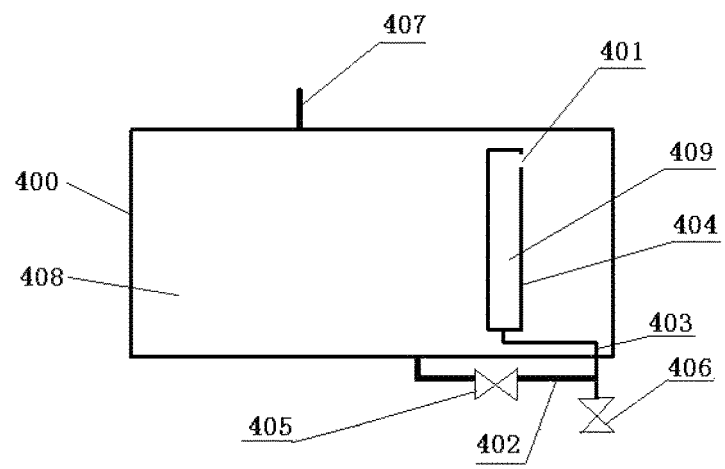
FIG. 14 is a structural diagram of a drug dosing device in embodiment 15.

As shown in FIG. 14, embodiment 13 or 14 is repeated, and the difference is that:

the drug dosing canister 300 is a horizontal high pressure canister, the canister body has a diameter of 1000 mm, a length of 2000 mm and a design pressure of 15 MPa, and both ends are sealed with welding seal heads;

the metering cavity 409 is an independent chamber with a height of 900 mm disposed in the drug dosing canister 400;

the cross section of the metering cavity 409 from top to bottom presents a square of 10 mm×10 mm, or presents a rectangle of 10 mm×20 mm or presents a circle having a diameter of 20 mm.

Embodiment 16

Figure 15:
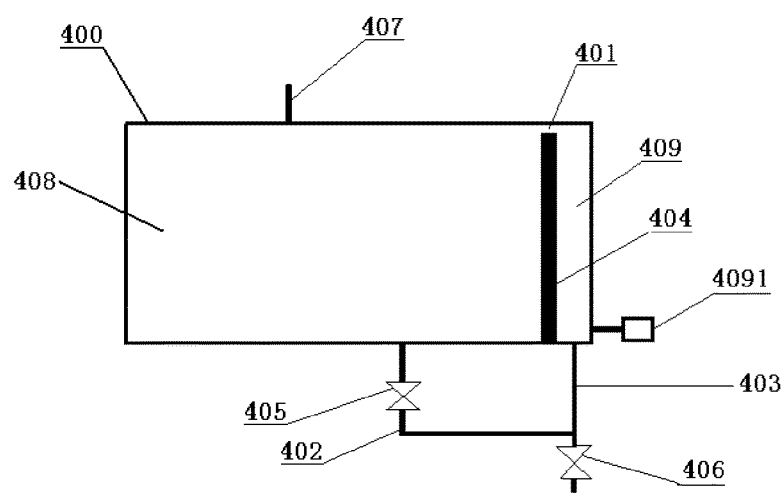
FIG. 15 is a structural diagram of a drug dosing device in embodiment 16.

As shown in FIG. 15, embodiment 13, 14 or 15 is repeated, and the difference is that: a pressure transmitter 4091 is disposed on the outer wall of the lower part or bottom of the metering cavity 409. After the reading of the pressure transmitter 4091 and liquid density (or proportion) are known, a corresponding liquid level can be quickly computed. Therefore, when the liquid level can be quickly changed, the pressure transmitter can effectively meter the liquid level.

Embodiment 17

Figure 16:
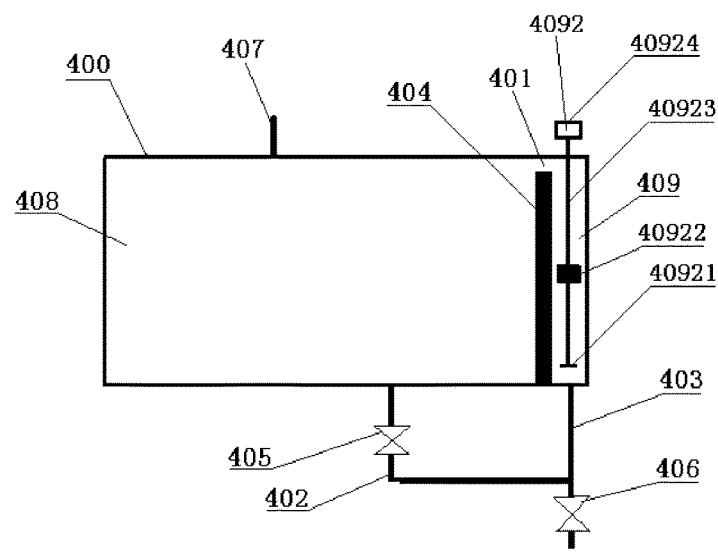
FIG. 16 is a structural diagram of a drug dosing device in embodiment 17.

As shown in FIG. 16, embodiment 13, 14 or 15 is repeated, and the difference is that: a magnetic float transmitter 4092 is disposed in the metering cavity 409. The magnetic float transmitter comprises a baffle plate 40921, a magnetic float 40922, a detection guiding pipe 40923 and a transmitter 40924. The magnetic float transmitter 4092 can be used for detecting the liquid level in the metering cavity.

Embodiment 18

Figure 17:
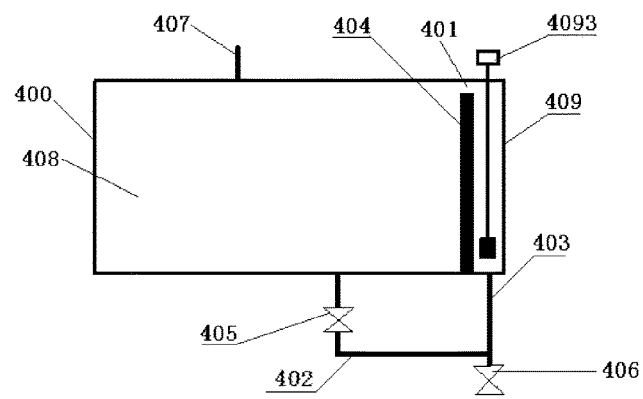
FIG. 17 is a structural diagram of a drug dosing device in embodiment 18.

As shown in FIG. 17, embodiment 13, 14 or 15 is repeated, and the difference is that: a hydrostatic level transmitter 4093 is disposed in the metering cavity 409; and the hydrostatic level transmitter 4093 is a magnetostrictive level transmitter. The hydrostatic level transmitter can be used for detecting the liquid level in the metering cavity.

Embodiment 19

Figure 18:
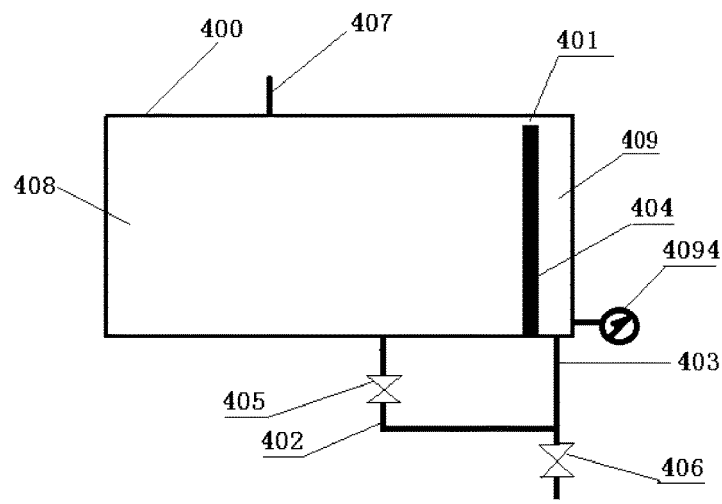
FIG. 18 is a structural diagram of a drug dosing device in embodiment 19.

As shown in FIG. 18, embodiment 13, 14 or 15 is repeated, and the difference is that: a pressure gauge 4094 is disposed on the outer wall of the lower part or bottom of the metering cavity 409. After the readings of the pressure gauge and liquid density (or proportion) are known, a corresponding liquid level can be quickly computed. Therefore, when the liquid level can be quickly changed, the pressure gauge can effectively meter the liquid level.

Embodiment 20

Figure 19:
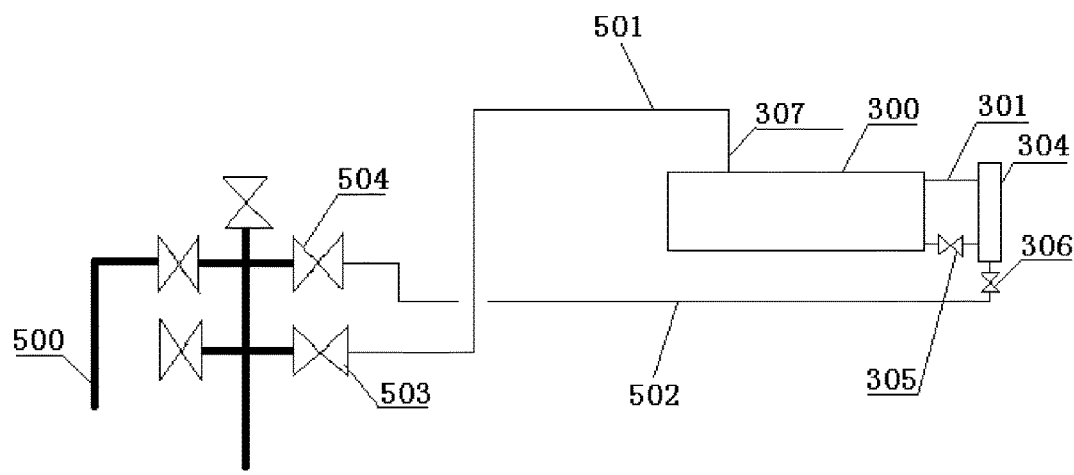
FIG. 19 is a structural diagram of an application structure of a drug dosing device in embodiment 20.

As shown in FIG. 19, a method for flow metering and control in a drug dosing process of an oil pipe of a gas well in the device of embodiments 1-12 comprises the following steps:

1) connecting:
first communicating the pressure release port 307 on the drug dosing canister 300 with a sleeve valve 503 of the gas well via a pressure release pipeline 501, and then communicating the control valve 306 of the drug dosing device with an oil pipe valve 504 of the gas well via a drug dosing pipeline 502;

2) dosing drug:
opening the switch valve 305, the control valve 306, the sleeve valve 503 of the gas well, and the oil pipe valve 504 of the gas well; enabling the functional chemical agents in the drug dosing canister 300 to enter the oil pipe of the gas well successively through the switch valve 305, the metering flow channel 304, the control valve 306, the drug dosing pipeline 502 and the oil pipe valve 504 of the gas well under the effect of sleeve pressure of the gas well; and meanwhile, automatically reaching a balance for the liquid levels in the drug dosing canister 300 and the metering flow channel 304.

It is known from the common knowledge in the art that: the gas well is formed by the sleeve and the oil pipe; the pressure of the sleeve of the gas well is inevitably greatly higher than the pressure of the oil pipe of the gas well (sometimes, even greater than 10 MPa); the pressure of the oil pipe of the gas well is inevitably higher than the pressure of the natural gas pipeline; after the drug dosing canister 300 communicates with the sleeve valve 503 of the gas well via a pressure release pipeline 501, the pressure in the drug dosing canister 300 is equivalent to the pressure of the sleeve of the gas well and is inevitably higher than the pressure of the oil pipe of the gas well and the natural gas pipeline 500; and the functional chemical agent in the drug dosing canister 300 can flow into the oil pipe of the gas well and the natural gas pipeline 500;

3) metering:
closing the switch valve 305; the drug in the drug dosing canister 300 stopping flow out, and the drug in the metering flow channel 304 beginning to enter the oil pipe valve 504 of the gas well via the control valve 306 and the drug dosing pipeline 502; quickly decreasing the liquid level of the metering flow channel 304; by measuring and recording the required time for decreasing the liquid level of the metering flow channel 304, quickly computing the drug dosing flow of the metering flow channel 304 based on the known cross section area (also known as flowing area) of the metering flow channel 304;

4) controlling the drug dosing flow:
quickly metering the current drug dosing flow of the drug dosing canister 300 according to the metering flow channel 304 and controlling the degree of opening of the control valve 306 according to the required drug dosage; repeating the metering and the controlling step; controlling the drug dosing flow of the metering flow channel 304 to a required drug dosing flow; then opening the switch valve 305, and the drug in the drug dosing canister 300 entering the oil pipe valve 504 of the gas well with the required drug dosing flow;

alternatively, quickly metering the current drug dosing flow of the drug dosing canister 300 according to the metering flow channel 304 and controlling the degree of opening of the control valve 306 according to the required drug dosage; then opening the switch valve 305 until the liquid level of the metering flow channel 304 and the liquid level of the drug dosing canister 300 are balanced; then closing the switch valve 305 and quickly metering the drug dosing flow of the metering flow channel 304 again; repeating the metering and the controlling step; controlling the drug dosing flow of the metering flow channel 304 to a required drug dosing flow; then opening the switch valve 305, and the drug in the drug dosing canister 300 entering the oil pipe valve 504 of the gas well with the required drug dosing flow;

It is known from the computation of common knowledge in the art that: because the total length (or equivalent total length) of the second flow channel 302 and the switch valve 305 is very short (generally not greater than 1 m) and is much less than the length (generally greater than 10 m) of the drug dosing pipeline 502 from the metering flow channel 304 to the oil pipe valve 504 of the gas well, ignoring the flowing resistance of the drug which enters the metering flow channel 304 from the drug dosing canister 300 and ignoring a difference between the drug dosing flow from the metering flow channel 304 into the oil pipe valve 504 of the gas well and the drug dosing flow from the drug dosing canister 300 into the oil pipe valve 504 of the gas well, the metering flow channel 304 can be used for precisely metering the drug dosing flow of the drug dosing canister 300.

Embodiment 21

As shown in FIG. 11 and FIG. 19, the drug dosing canister 300 is a manganese steel pressure container having an inner diameter of 600 mm (an outer diameter of 700 mm), a design pressure of 25 MPa and a length of 1500 mm, and both ends are welded and sealed with elliptical seal heads; one DN 20 mm of 16 Mn steel flange type short pipe is respectively welded on the upper part and the lower part of the right seal head; one DN 25 mm of manganese steel flange type safety valve interface is welded in the center of the top, and a spring type safety valve is installed; one DN 15 mm of manganese steel flange type emptying interface 307 is welded on the left of the top, and a needle valve is installed; one DN 15 mm of manganese steel thread pressure gauge interface is welded on the right of the top and a needle valve and a pressure gauge are installed; one DN 25 mm of manganese steel flange type drug supplementing interface is welded on the bottom, and a needle valve and a check valve are installed;

the first flow channel 301 and the second flow channel 302 are stainless steel pipes with a diameter of DN 20 mm, pressure resistance of 32 MPa and DN 20 mm of flanges on both ends;

the metering flow channel 304 is a stainless steel hollow pipe, and has a diameter of DN 20 mm (an inner diameter of 20 mm), a length of 1400 mm and a design pressure of 32 MPa; the upper end and the lower end are welded and sealed; one DN 20 mm of stainless steel flange type short pipe is respectively welded on the upper end and the lower end on the same side surface; the upper flange type short pipe has a distance of 150 mm from the top, and the lower flange type short pipe has a distance of 150 mm from the bottom; one DN 15 mm of stainless steel thread short pipe (the third flow channel 303) is welded on the bottom; the bottom of the metering flow channel 304 is lower than the bottom of the drug dosing canister 300 by 350 mm, and the top is higher than the top of the drug dosing canister 300 by 350 mm;

the DN 15 mm of 304 stainless steel thread short pipe welded on the bottom of the metering flow channel 304 is the third flow channel 303;

the control valve 306 is a DN 15 mm of stainless steel thread connecting stop valve;

and the switch valve 305 is a DN 20 mm of stainless steel flange stop valve.

Concrete operation steps for increasing the drug dosing flow:

1) closing the switch valve 305; the drug in the drug dosing canister 300 stopping flow out, and the drug in the metering flow channel 304 entering the oil pipe valve 504 of the gas well via the control valve 306 and the drug dosing pipeline 502; quickly decreasing the liquid level of the metering flow channel 304;

2) measuring the required time for decreasing the liquid level of the metering flow channel 304 to a certain liquid level (e.g., 50 mm) by using a portable ultrasonic level gauge, and computing the flow of the effluent drug based on the known cross section area to obtain the current drug dosing flow;

3) then turning up the degree of opening of the control valve 306; obtaining a new drug dosing flow with the metering flow channel 304, and judging whether the new drug dosing flow satisfies a need; if the new drug dosing flow is still less than the required drug dosing flow, turning up the degree of opening of the control valve 306 again; and obtaining the new drug dosing flow with the metering flow channel 304, and judging whether the new drug dosing flow satisfies the need; otherwise, if the new drug dosing flow is already greater than the required drug dosing flow, turning down the degree of opening of the control valve 306; and obtaining the new drug dosing flow with the metering flow channel 304 again, and judging whether the new drug dosing flow satisfies the need;

4) controlling for several times in this way for increasing the drug dosing flow of the metering flow channel 304 to the required flow;

and 5) then opening the switch valve 305, and the drug in the drug dosing canister 300 entering the oil pipe valve 504 of the gas well with the required drug dosing flow, thereby realizing the purposes of quick metering and quick control of the drug dosing flow.

It is known from the common knowledge in the art that: the constant cross section area of the stainless steel pipe with the inner diameter of 20 mm is 0.000314 $m^2$ (or 314 $mm^2$), and the liquid quantity with a decrease of 50 mm of the liquid level is 0.0157 l (or 15.7 ml); the required time for metering the drug dosing flow in 0.5 l per hour is confirmed to be only 113 seconds; and the required time for metering the drug dosing flow in 1.25 l per hour is confirmed to be only 45 seconds.

It is known from the computation of common knowledge in the art that: a method for measuring the liquid level of the closed container by using an ultrasonic level gauge or a hand-held portable ultrasonic level gauge is a frequently-used technical means in the art, and can be used for quick non-contact measurement of the liquid level of the liquid in the metal pipe and can be used for quick measurement of the declined liquid level and the liquid quantity of the liquid in a vertical pipe.

Embodiment 22

Embodiment 21 is repeated, and the difference is that:
the metering flow channel 304 is a magnetic float type level gauge having an inner pipe diameter of 50 mm, a length of 500 mm, a design pressure of 25 MPa, a higher bottom than the bottom of the drug dosing canister 300 by 100 mm and a lower top than the top of the drug dosing canister 300 by 100 mm.

Operation steps for decreasing the drug dosing flow:
1) closing the switch valve 305; the drug in the drug dosing canister 300 stopping flow out, and the drug in the metering flow channel 304 entering the oil pipe valve 504 of the gas well via the control valve 306 and the drug dosing pipeline 502; quickly decreasing the liquid level of the metering flow channel 304;

2) measuring and recording the required time for decreasing the liquid level of the metering flow channel 304 to a certain liquid level (e.g., 10 mm) according to the scale indication of a magnetic turning plate of the magnetic float type level gauge, and computing the flow of the effluent drug based on the known cross section area to obtain the current drug dosing flow;

3) then turning down the degree of opening of the control valve 306; obtaining the new drug dosing flow with the metering flow channel 304, and judging whether the new drug dosing flow satisfies a need; if the new drug dosing flow is still greater than the required drug dosing flow, turning down the degree of opening of the control valve 306 again; and obtaining the new drug dosing flow with the metering flow channel 304 again, and judging whether the new drug dosing flow satisfies the need; otherwise, if the new drug dosing flow is already less than the required drug dosing flow, turning up the degree of opening of the control valve 306; and obtaining the new drug dosing flow with the metering flow channel 304 again, and judging whether the new drug dosing flow satisfies the need;

4) controlling for several times in this way for increasing the drug dosing flow of the metering flow channel 304 to the required flow;

and 5) then opening the switch valve 305, and the drug in the drug dosing canister 300 entering the oil pipe valve 504 of the gas well with the required drug dosing flow, thereby realizing the purposes of quick metering and quick control of the drug dosing flow.

It is known from the computation of common knowledge in the art that: the constant cross section area of the stainless steel pipe with the inner pipe diameter of 50 mm is 0.0019625 m² (or 1962.5 mm²), and the liquid quantity with a decrease of 10 mm of the liquid level is 0.019625 l (or 19.625 ml); the required time for metering the drug dosing flow in 0.5 l per hour is confirmed to be only 141 seconds; and the required time for metering the drug dosing flow in 1.25 l per hour is confirmed to be only 57 seconds.

It is known from the common knowledge in the art that: a method for measuring and displaying the liquid level of the closed container by using the magnetic float type level gauge is a frequently-used technical means in the art, and a sewage draining valve and a sewage draining pipe may be or may not be disposed on the lower part.

Embodiment 23

Figure 20:
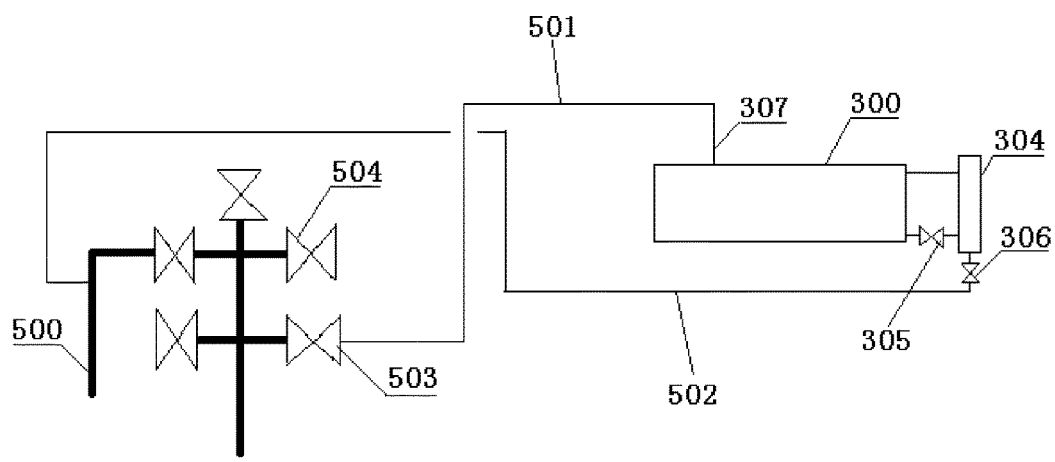
FIG. 20 is a structural diagram of an application structure of a drug dosing device in embodiment 23.

As shown in FIG. 20, embodiment 20, 21 or 22 is repeated, and the difference is only that: a pressure gauge 4094 is disposed on the outer wall of the lower part or bottom of the metering cavity 409. Preferably, the device of embodiments 1-12 is applied to flow metering and control in a drug dosing process of the natural gas pipeline of a well site. A structural difference is only that: the pressure release port 307 on the drug dosing canister 300 communicates with a sleeve valve 503 of the gas well via a pressure release pipeline 501, and then the control valve 306 communicates with the natural gas pipeline 500 of the well site via a drug dosing pipeline 502.

Embodiment 24

Figure 21:
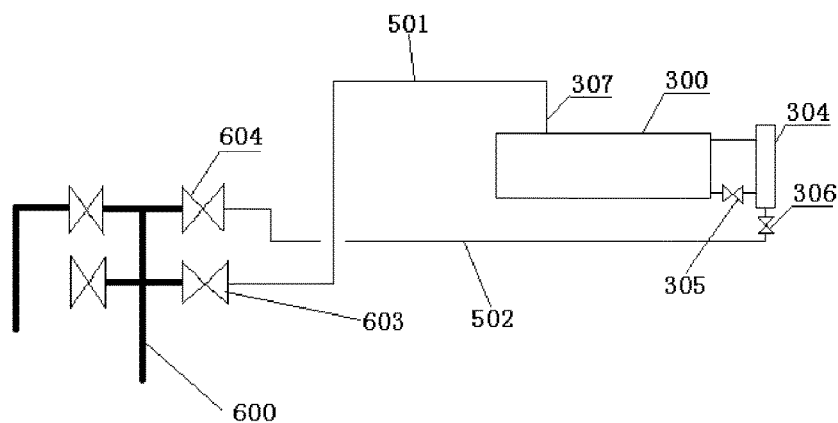
FIG. 21 is a structural diagram of an application structure of a drug dosing device in embodiment 24.

As shown in FIG. 21, embodiment 20, 21 or 22 is repeated, and the difference is only that: a pressure gauge 4094 is disposed on the outer wall of the lower part or bottom of the metering cavity 409. Preferably, the device of embodiments 1-12 is applied to flow metering and control in a drug dosing process of the oil pipe of the oil well 600. A structural difference is only that: the pressure release port 307 on the drug dosing canister 300 communicates with a sleeve valve 603 of the oil well via a pressure release pipeline 501, and then the control valve 306 communicates with the oil pipe valve 604 of the oil well via a drug dosing pipeline 502.

Embodiment 25

Figure 22:
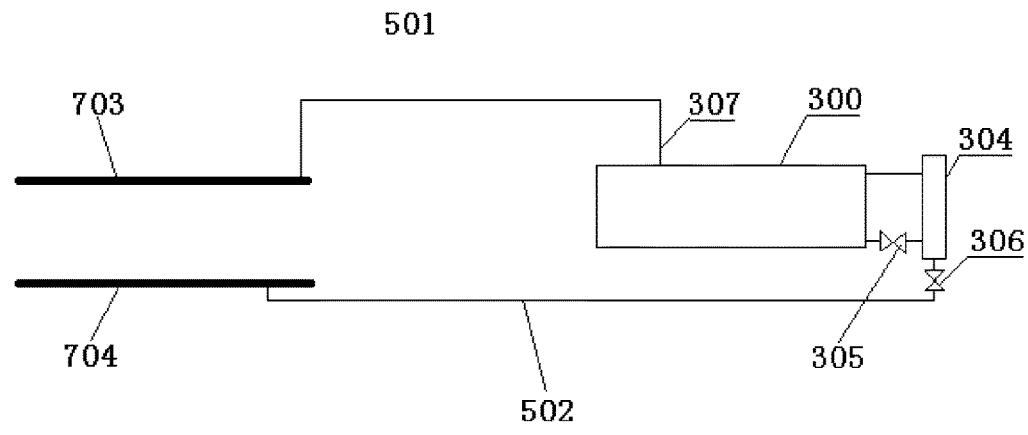
FIG. 22 is a structural diagram of an application structure of a drug dosing device in embodiment 25.

As shown in FIG. 22, embodiment 20, 21 or 22 is repeated, and the difference is only that: the device of embodiments 1-12 is applied to flow metering and control in a drug dosing process of an interstation natural gas pipeline (or an outer transportation pipeline of a gas gathering station). A structural difference is only that: the pressure release port 307 on the drug dosing canister 300 communicates with a station incoming pipeline 703 of the gas well via a pressure release pipeline 501, and then the control valve 306 communicates with the interstation natural gas pipeline (or the outer transportation pipeline of the gas gathering station) 704 via a drug dosing pipeline 502.

Embodiment 26

Figure 23:
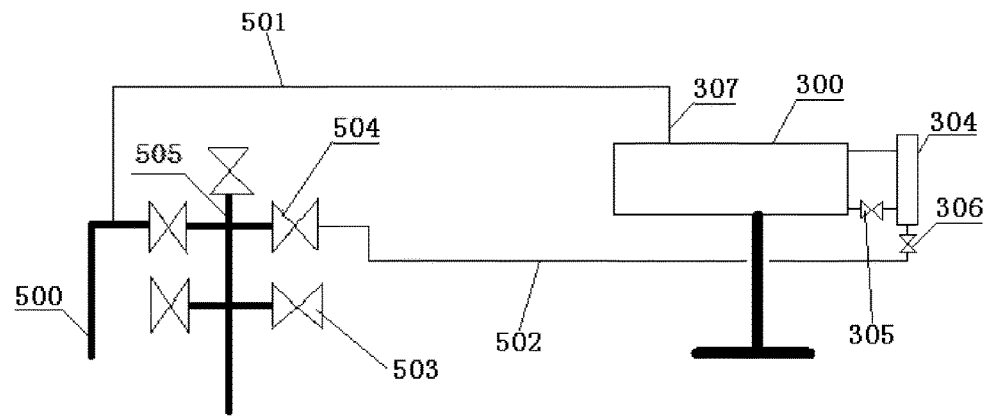
FIG. 23 is a structural diagram of an application structure of a drug dosing device in embodiment 26.

As shown in FIG. 23, embodiment 23 is repeated, and the device of embodiments 1-12 is applied to flow metering and control in a drug dosing process of the natural gas pipeline of the well site. A structural difference is only that: the bottom of the drug dosing canister 300 is first elevated to be greater than the height of the oil pipe valve 504 of a gas production tree; then the pressure release port 307 on the drug dosing canister 300 communicates with a natural gas pipeline 500 on one side of the gas production tree via a pressure release pipeline 501; and the control valve 306 communicates with an oil pipe valve 504 on the other side of the gas production tree via a drug dosing pipeline 502.

A difference in the drug dosing step is only that: the switch valve 305, the control valve 306, and the oil pipe valve 504 of the gas well are opened; the functional chemical agents in the drug dosing canister 300 are enabled to enter the natural gas pipeline of the well site successively through the switch valve 305, the metering flow channel 304, the control valve 306, the drug dosing pipeline 502, the oil pipe valve 504 of the gas well and the upper four-way valve 505 under a gravitational effect; and meanwhile, a balance for the liquid levels in the drug dosing canister 300 and the metering flow channel 304 is automatically reached.

Embodiment 27

Figure 24:
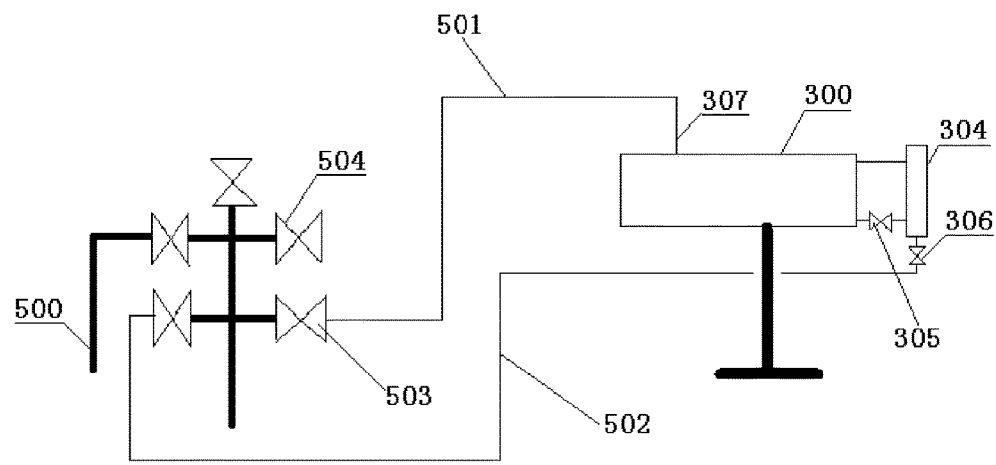
FIG. 24 is a structural diagram of an application structure of a drug dosing device in embodiment 27.

As shown in FIG. 24, embodiment 23 is repeated, and the device of embodiments 1-12 is applied to flow metering and control in a drug dosing process of the sleeve of the gas well. A structural difference is only that: the bottom of the drug dosing canister 300 is first elevated to be greater than the height of the sleeve valve 503 of a gas production tree; then the pressure release port 307 on the drug dosing canister 300 communicates with the sleeve valve 503 of the gas well on one side of the gas production tree via a pressure release pipeline 501; and the control valve 306 communicates with the sleeve valve of the gas well on the other side of the gas production tree via a drug dosing pipeline 502.

A difference in the drug dosing step is only that: the switch valve 305, the control valve 306, and the sleeve valves 503 of the gas well on both sides of the gas production tree are opened; the functional chemical agents in the drug dosing canister 300 are enabled to enter the sleeve of the gas well successively through the switch valve 305, the metering flow channel 304, the control valve 306, the drug dosing pipeline 502 and the sleeve valves 503 of the gas well under a gravitational effect; and meanwhile, a balance for the liquid levels in the drug dosing canister 300 and the metering flow channel 304 is automatically reached.

Embodiment 28

Figure 25:
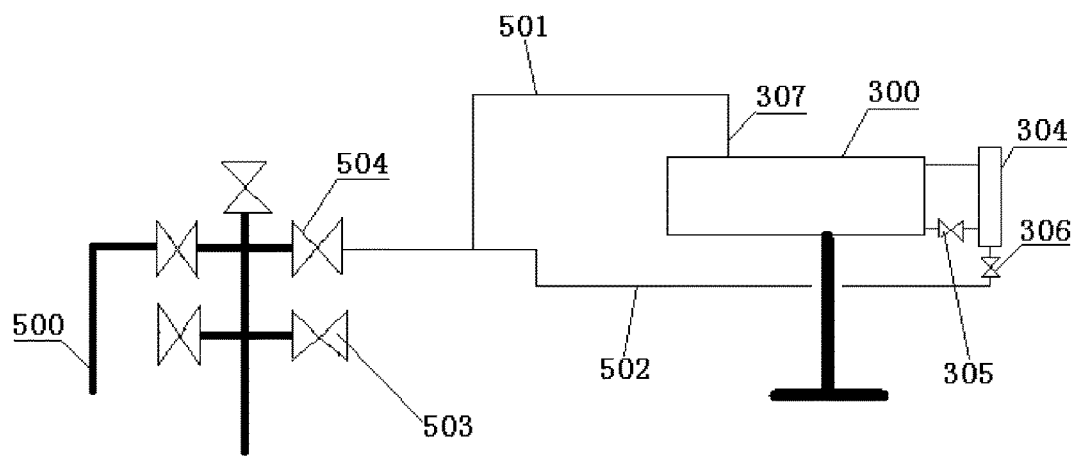
FIG. 25 is a structural diagram of an application structure of a drug dosing device in embodiment 28.

As shown in FIG. 25, embodiment 23 is repeated, and the device of embodiments 1-12 is applied to flow metering and control in a drug dosing process of the oil pipe of the gas well. A structural difference is only that: the bottom of the drug dosing canister 300 is first elevated to be greater than the height of the oil pipe valve 504 of a gas production tree; then the pressure release port 307 on the drug dosing canister 300 communicates with the oil pipe valve 504 of the gas well on one side of the gas production tree via a pressure release pipeline 501; and the control valve 306 communicates with the same oil pipe valve 504 of the gas well via a drug dosing pipeline 502.

A difference in the drug dosing step is only that: the switch valve 305, the control valve 306, and the oil pipe valve 504 of the gas well are opened; the functional chemical agents in the drug dosing canister 300 are enabled to enter the oil pipe of the gas well successively through the switch valve 305, the metering flow channel 304, the control valve 306, the drug dosing pipeline 502 and the oil pipe valve 504 of the gas well under a gravitational effect; and meanwhile, a balance for the liquid levels in the drug dosing canister 300 and the metering flow channel 304 is automatically reached.

Embodiment 29

Figure 26:
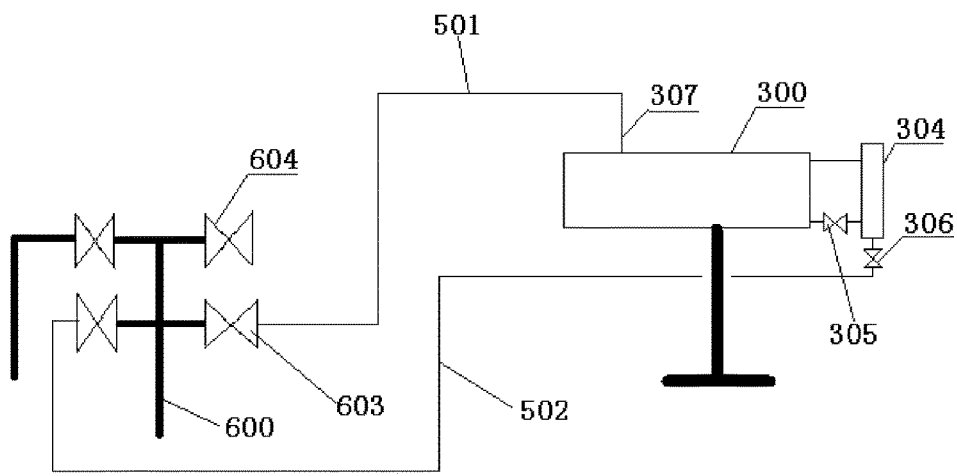
FIG. 26 is a structural diagram of an application structure of a drug dosing device in embodiment 29.

As shown in FIG. 26, embodiment 23 is repeated, and the device of embodiments 1-12 is applied to flow metering and control in a drug dosing process of the sleeve of the oil well 600. A structural difference is only that: the bottom of the drug dosing canister 300 is first elevated to be greater than the height of the sleeve valve 603 of an oil production tree; then the pressure release port 307 on the drug dosing canister 300 communicates with the sleeve valve 603 of the oil well on one side of the oil production tree via a pressure release pipeline 501; and the control valve 306 communicates with the sleeve valve of the oil well on the other side of the oil production tree via a drug dosing pipeline 502.

A difference in the drug dosing step is only that: the switch valve 305, the control valve 306, and the sleeve valves 603 of the oil well 600 on both sides of the oil production tree are opened; the functional chemical agents in the drug dosing canister 300 are enabled to enter the sleeve of the oil well 600 successively through the switch valve 305, the metering flow channel 304, the control valve 306, the drug dosing pipeline 502 and the sleeve valves 603 of the oil well 600 under a gravitational effect; and meanwhile, a balance for the liquid levels in the drug dosing canister 300 and the metering flow channel 304 is automatically reached.

Embodiment 30

Figure 27:
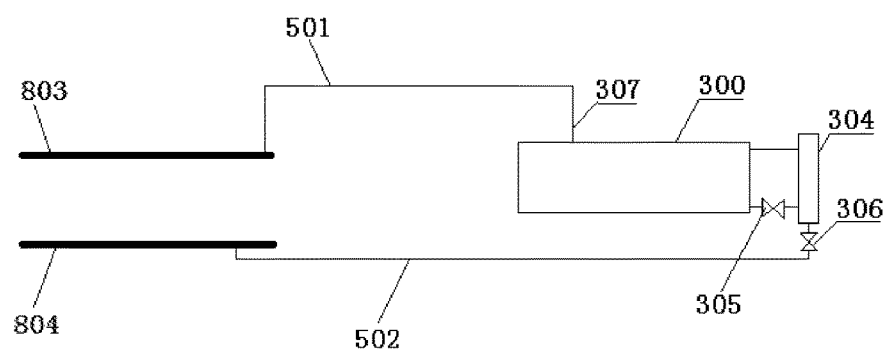
FIG. 27 is a structural diagram of an application structure of a drug dosing device in embodiment 30.

As shown in FIG. 27, embodiment 23 is repeated, and the device of embodiments 1-12 is applied to flow metering and control in a drug dosing process of a liquid flow channel. A structural difference is only that: the pressure release port 307 on the drug dosing canister 300 communicates with a compressed gas source 803 via a pressure release pipeline 501, and then the control valve 306 communicates with the liquid flow channel 804 via a drug dosing pipeline 502.

The compressed gas source can be any one of a nitrogen gas bottle, a liquefied gas bottle, an oxygen gas bottle, an acetylene bottle, a carbon dioxide gas canister, a compressed natural gas canister (e.g., CNG), instrument air, an air compressor, a pressure fan, a gas pump, a mobile compressed gas source, compressed natural gas (e.g., CNG), liquid nitrogen, liquid carbon dioxide and liquefied gas (e.g., LNG).

Embodiment 31

Figure 28:
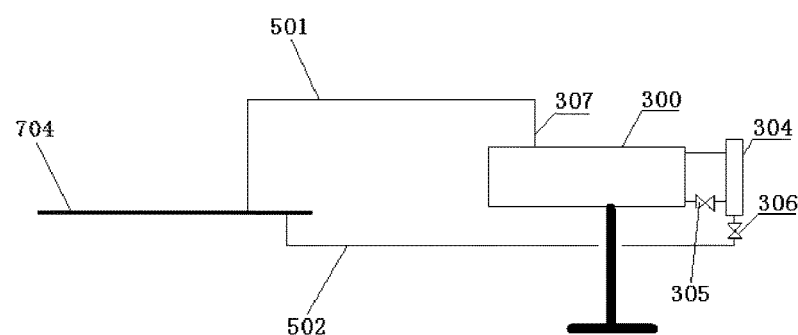
FIG. 28 is a structural diagram of an application structure of a drug dosing device in embodiment 31.

As shown in FIG. 28, embodiment 23 is repeated, and the device of embodiments 1-12 is applied to flow metering and control in a drug dosing process of the interstation natural gas pipeline (or the outer transportation pipeline of the gas gathering station). A structural difference is only that: the bottom of the drug dosing canister 300 is first elevated to be greater than the height of the interstation natural gas pipeline (or the outer transportation pipeline of the gas gathering station) 704; then the pressure release port 307 on the drug dosing canister 300 communicates with the interstation natural gas pipeline (or the outer transportation pipeline of the gas gathering station) 704 via a pressure release pipeline 501; and the control valve 306 communicates with the interstation natural gas pipeline (or the outer transportation pipeline of the gas gathering station) 704 via a drug dosing pipeline 502.

A difference in the drug dosing step is only that: the switch valve 305 and the control valve 306 are opened; the functional chemical agents in the drug dosing canister 300 are enabled to enter the interstation natural gas pipeline (or the outer transportation pipeline of the gas gathering station) successively through the switch valve 305, the metering flow channel 304, the control valve 306 and the drug dosing pipeline 502 under a gravitational effect; and meanwhile, a balance for the liquid levels in the drug dosing canister 300 and the metering flow channel 304 is automatically reached.

Embodiment 32

Figure 29:
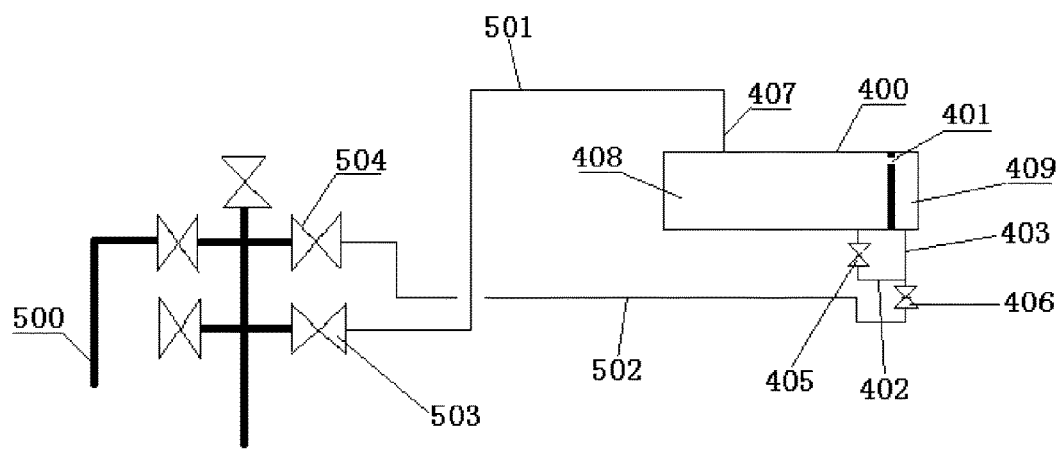
FIG. 29 is a structural diagram of an application structure of a drug dosing device in embodiment 32.

As shown in FIG. 29, a method for flow metering and control in a drug dosing process of an oil pipe of a gas well in the device of embodiments 13-19 comprises the following steps:

1) connecting:
first communicating the pressure release port 407 on the drug dosing canister 400 with a sleeve valve 503 of the gas well via a pressure release pipeline 501, and then communicating the control valve 406 of the drug dosing device with an oil pipe valve 504 of the gas well via a drug dosing pipeline 502;

2) dosing drug:
opening the switch valve 405, the control valve 406, the sleeve valve 503 of the gas well, and the oil pipe valve 504 of the gas well; enabling the functional chemical agents in the drug storing cavity 408 to enter the oil pipe of the gas well successively through the switch valve 405, the third flow channel 403, the control valve 406, the drug dosing pipeline 502 and the oil pipe valve 504 of the gas well under the effect of sleeve pressure of the gas well; and meanwhile, automatically reaching a balance for the liquid levels in the drug storing cavity 408 and the metering cavity 409.

3) metering:
closing the switch valve 405; the drug in the drug storing cavity 408 stopping flow out, and the drug in the metering cavity 409 beginning to enter the oil pipe valve 504 of the gas well via the control valve 406 and the drug dosing pipeline 502; quickly decreasing the liquid level of the metering cavity 409; by measuring and recording the required time for decreasing the liquid level of the metering cavity 409, quickly computing the drug dosing flow of the metering cavity 409 based on the known cross section area (also known as flowing area) of the metering cavity 409;

4) controlling the drug dosing flow:
quickly metering the current drug dosing flow of the drug storing cavity 408 according to the metering cavity 409 and controlling the degree of opening of the control valve 406 according to the required drug dosage; repeating the metering and the controlling step; controlling the drug dosing flow of the metering cavity 409 to a required drug dosing flow; then opening the switch valve 405, and the drug in the drug storing cavity 408 entering the oil pipe valve 504 of the gas well with the required drug dosing flow;

alternatively, quickly metering the current drug dosing flow of the drug storing cavity 408 according to the metering cavity 409 and controlling the degree of opening of the control valve 406 according to the required drug dosage; then opening the switch valve 405 until the liquid level of the metering cavity 409 and the liquid level of the drug storing cavity 408 are balanced; then closing the switch valve 405 and quickly metering the drug dosing flow of the metering cavity 409 again; repeating the metering and the controlling step; controlling the drug dosing flow of the metering cavity 409 to a required drug dosing flow; and then opening the switch valve 405, and the drug in the drug storing cavity 408 entering the oil pipe valve 504 of the gas well with the required drug dosing flow.

Embodiment 33

Embodiment 32 is repeated, and the difference is only that: the device of embodiments 13-19 is applied to flow metering and control in a drug dosing process of the natural gas pipeline of a well site. A structural difference is only that: the pressure release port 407 on the drug dosing canister 400 communicates with a sleeve valve 503 of the gas well via a pressure release pipeline 501, and then the control valve 406 communicates with the natural gas pipeline 500 of the well site via a drug dosing pipeline 502.

Embodiment 34

Embodiment 32 is repeated, and the difference is only that: the device of embodiments 13-19 is applied to flow metering and control in a drug dosing process of the oil pipe of the oil well. A structural difference is only that: the pressure release port 407 on the drug dosing canister 400 communicates with a sleeve valve 603 of the oil well via a pressure release pipeline 501, and then the control valve 406 communicates with the oil pipe valve 604 of the oil well via a drug dosing pipeline 502.

Embodiment 35

Embodiment 32 is repeated, and the difference is only that: the device of embodiments 13-19 is applied to flow metering and control in a drug dosing process of an interstation natural gas pipeline (or an outer transportation pipeline of a gas gathering station). A structural difference is only that: the pressure release port 407 on the drug dosing canister 400 communicates with a station incoming pipeline 703 of the gas well via a pressure release pipeline 501, and then the control valve 406 communicates with the interstation natural gas pipeline (or the outer transportation pipeline of the gas gathering station) 704 via a drug dosing pipeline 502.

Embodiment 36

Embodiment 32 is repeated, and the difference is only that: the device of embodiments 13-19 is applied to flow metering and control in a drug dosing process of the natural gas pipeline of a well site. A structural difference is only that: the bottom of the drug dosing canister 400 is first elevated to be greater than the height of the oil pipe valve 504 of a gas production tree; then the pressure release port 407 on the drug dosing canister 400 communicates with a natural gas pipeline 500 on one side of the gas production tree via a pressure release pipeline 501; and the control valve 406 communicates with an oil pipe valve 504 on the other side of the gas production tree via a drug dosing pipeline 502.

A difference in the drug dosing step is only that: the switch valve 405, the control valve 406, and the oil pipe valve 504 of the gas well are opened; the functional chemical agents in the drug storing cavity 408 of the drug dosing canister 400 are enabled to enter the natural gas pipeline of the well site successively through the switch valve 405, the third flow channel 403, the control valve 406, the drug dosing pipeline 502, the oil pipe valve 504 of the gas well and the upper four-way valve 505 under a gravitational effect; and meanwhile, a balance for the liquid levels in the drug storing cavity 408 and the metering cavity 409 is automatically reached.

Embodiment 37

Embodiment 32 is repeated, and the difference is only that: the device of embodiments 13-19 is applied to flow metering and control in a drug dosing process of the sleeve of the gas well. A structural difference is only that: the bottom of the drug dosing canister 400 is first elevated to be greater than the height of the sleeve valve 503 of a gas production tree; then the pressure release port 407 on the drug dosing canister 400 communicates with the sleeve valve 503 of the gas well on one side of the gas production tree via a pressure release pipeline 501; and the control valve 406 communicates with the sleeve valve 503 of the gas well on the other side of the gas production tree via a drug dosing pipeline 502.

A difference in the drug dosing step is only that: the switch valve 405, the control valve 406, and the sleeve valves 503 of the gas well on both sides of the gas production tree are opened; the functional chemical agents in the drug storing cavity 408 of the drug dosing canister 400 are enabled to enter the sleeve of the gas well successively through the switch valve 405, the third flow channel 403, the control valve 406, the drug dosing pipeline 502 and the sleeve valves 503 of the gas well under a gravitational effect; and meanwhile, a balance for the liquid levels in the drug storing cavity 408 and the metering cavity 409 is automatically reached.

Embodiment 38

Embodiment 32 is repeated, and the difference is only that: the device of embodiments 13-19 is applied to flow metering and control in a drug dosing process of the oil pipe of the gas well. A structural difference is only that: the bottom of the drug dosing canister 400 is first elevated to be greater than the height of the oil pipe valve 504 of a gas production tree; then the pressure release port 407 on the drug dosing canister 400 communicates with the oil pipe valve 504 of the gas well on one side of the gas production tree via a pressure release pipeline 501; and the control valve 406 communicates with the same oil pipe valve 504 of the gas well via a drug dosing pipeline 502.

A difference in the drug dosing step is only that: the switch valve 405, the control valve 406, and the oil pipe valve 504 of the gas well are opened; the functional chemical agents in the drug storing cavity 408 of the drug dosing canister 400 are enabled to enter the sleeve of the gas well successively through the switch valve 405, the third flow channel 403, the control valve 406, the drug dosing pipeline 502 and the oil pipe valve 504 of the gas well under a gravitational effect; and meanwhile, a balance for the liquid levels in the drug storing cavity 408 and the metering cavity 409 is automatically reached.

Embodiment 39

Embodiment 32 is repeated, and the difference is only that: the device of embodiments 13-19 is applied to flow metering and control in a drug dosing process of the sleeve of the oil well. A structural difference is only that: the bottom of the drug dosing canister 400 is first elevated to be greater than the height of the sleeve valve 603 of an oil production tree of the oil well 600; then the pressure release port 407 on the drug dosing canister 400 communicates with the sleeve valve 603 of the oil well on one side of the oil production tree via a pressure release pipeline 501; and the control valve communicates with the sleeve valve 603 of the oil well on the other side of the oil production tree via a drug dosing pipeline 502.

A difference in the drug dosing step is only that: the switch valve 405, the control valve 406, and the sleeve valves 603 on both sides of the oil production tree are opened; the functional chemical agents in the drug storing cavity 408 of the drug dosing canister 400 are enabled to enter the sleeve of the oil well successively through the switch valve 405, the third flow channel 403, the control valve 406, the drug dosing pipeline 502 and the sleeve valves 603 of the oil well under a gravitational effect; and meanwhile, a balance for the liquid levels in the drug storing cavity 408 and the metering cavity 409 is automatically reached.

Embodiment 40

Embodiment 32 is repeated, and the difference is only that: the device of embodiments 13-19 is applied to flow metering and control in a drug dosing process of a liquid flow channel. A structural difference is only that: the pressure release port 407 on the drug dosing canister 400 communicates with a compressed gas source 803 via a pressure release pipeline 501, and then the control valve 406 communicates with the liquid flow channel 804 via a drug dosing pipeline 502.

The compressed gas source can be any one of a nitrogen gas bottle, a liquefied gas bottle, an oxygen gas bottle, an acetylene bottle, a carbon dioxide gas canister, a compressed natural gas canister (e.g., CNG), instrument air, an air compressor, a pressure fan, a gas pump, a mobile compressed gas source, compressed natural gas (e.g., CNG), liquid nitrogen, liquid carbon dioxide and liquefied gas (e.g., LNG).

Embodiment 41

Embodiment 32 is repeated, and the difference is only that: the device of embodiments 13-19 is applied to flow metering and control in a drug dosing process of an interstation natural gas pipeline (or an outer transportation pipeline of a gas gathering station). A structural difference is only that: the bottom of the drug dosing canister 400 is first elevated to be greater than the height of the interstation natural gas pipeline (or the outer transportation pipeline of the gas gathering station) 704; then the pressure release port 407 on the drug dosing canister 400 communicates with the interstation natural gas pipeline (or the outer transportation pipeline of the gas gathering station) 704 via a pressure release pipeline 501; and the control valve 406 communicates with the interstation natural gas pipeline (or the outer transportation pipeline of the gas gathering station) 704 via a drug dosing pipeline 502.

A difference in the drug dosing step is only that: the switch valve 405 and the control valve 406 are opened; the functional chemical agents in the drug storing cavity 408 of the drug dosing canister 400 are enabled to enter the interstation natural gas pipeline (or the outer transportation pipeline of the gas gathering station) successively through the switch valve 405, the third flow channel 403, the control valve 406 and the drug dosing pipeline 502 under a gravitational effect; and meanwhile, a balance for the liquid level in the drug storing cavity 408 and the liquid level in the metering cavity 409 is automatically reached.

Words adopted herein for describing orientations, such as "upper", "lower", "left", "right" and the like, are in accordance with the orientations shown in the drawing planes of the drawings for the convenience of description, and these orientations may differ in actual devices due to the placement mode of the device.

Apparently, the above embodiments of the present invention are only examples made for clearly describing the present invention, and do not define the embodiments of the present invention. For those ordinary skilled in the art, other variations or changes in other forms can also be made based on the above description. Not all of the embodiments are enumerated herein. Apparent variations or changes derived from the technical solutions of the present invention are still within the protection scope of the present invention.

The invention claimed is:
1. A drug dosing device for dosage metering and control, comprising a drug dosing canister, a first flow channel, a second flow channel, a third flow channel, a metering flow channel, a switch valve, a control valve and a pressure release port;
   wherein an upper part or a top of the drug dosing canister communicates with an upper part or a top of the metering flow channel via the first flow channel;
   a lower part or a bottom of the drug dosing canister communicates with a lower part or a bottom of the metering flow channel via the second flow channel; the switch valve is disposed on the second flow channel;
   the bottom or the lower part of the metering flow channel communicates with the control valve via the third flow channel;
   the pressure release port is disposed at the upper part or the top of the drug dosing canister; and
   the cross section area of the metering flow channel is less than the cross section area of the drug dosing canister.

2. The drug dosing device for dosage metering and control according to claim 1, wherein the first flow channel, the second flow channel and the third flow channel are any one or any combination of at least two of a pipeline, a pipe fitting, a porous channel, a through hole, a mechanical component and a mechanical assembly internally provided with fluid channels.

3. The drug dosing device for dosage metering and control according to claim 1, wherein the metering flow channel is any one or any combination of at least two of a pipeline, a pipe fitting, a porous channel, a through hole, a mechanical component and a mechanical assembly internally provided with a fluid channel.

4. The drug dosing device for dosage metering and control according to claim 3, wherein the metering flow channel is a glass pipe level gauge, a glass plate type level gauge, a colored quartz tube type level gauge or a sight glass type level gauge.

5. The drug dosing device for dosage metering and control according to claim 3, wherein the metering flow channel is a magnetic float type level gauge or a magnetic sensitive electronic two-color level gauge made by using a buoyancy principle and a magnetic coupling effect.

6. The drug dosing device for dosage metering and control according to claim 3, wherein the metering flow channel is a remote transmission type magnetic float type level gauge which uses a buoyancy principle and a magnetic coupling effect and comprises a sensor, a transmitter and a display.

7. The drug dosing device for dosage metering and control according to claim 3, wherein the metering flow channel comprises a flanged housing, a flanged magnetic floating ball level transmitter, an upper interface, a lower interface and a bottom interface, and the lower end of the magnetic floating ball level transmitter extends to the lower part in the housing.

8. The drug dosing device for dosage metering and control according to claim 3, wherein the metering flow channel comprises a threaded housing, a threaded hydrostatic level transmitter, an upper interface, a lower interface and a bottom interface, wherein the lower end of the hydrostatic level transmitter extends to the lower part in the housing; and the hydrostatic level transmitter is a magnetostrictive level transmitter.

9. The drug dosing device for dosage metering and control according to claim 3, wherein the metering flow channel comprises a housing, a pressure transmitter, an upper interface, a lower interface and a bottom interface, and the pressure transmitter is disposed on the lower part or the bottom of the housing.

10. The drug dosing device for dosage metering and control according to claim 3, wherein the metering flow channel comprises a housing, a pressure gauge, an upper interface, a lower interface and a bottom interface, and the pressure gauge is disposed on the lower part or the bottom of the housing.

11. The drug dosing device for dosage metering and control according to claim 3, wherein the metering flow channel comprises a housing, a magnetic float, an upper interface, a lower interface, a bottom interface and colored iron powder, and the magnetic float is disposed in the housing and the colored iron powder is disposed outside the housing in a position corresponding to the magnetic float.

12. The drug dosing device for dosage metering and control according to claim 1, wherein a design pressure of the control valve is not less than a design pressure of the metering flow channel, and the control valve is selected from a gate valve, a needle valve, a stop valve, a ball valve or a butterfly valve.

13. The drug dosing device for dosage metering and control according to claim 1, wherein the pressure release port is any one or any combination of at least two of a pipeline, a pipe fitting, a porous channel, a through hole, a mechanical component and a mechanical assembly internally provided with a fluid channel.

14. The drug dosing device for dosage metering and control according to claim 1, wherein,
a safety valve is disposed on the drug dosing canister, and the safety valve is disposed on the top or the upper part of the drug dosing canister;
a pressure gauge or a pressure transmitter is disposed on the drug dosing canister;
an emptying interface is disposed on the drug dosing canister, and the emptying interface is disposed on the top or the upper part of the drug dosing canister;
a sewage draining port is disposed on the drug dosing canister; and
a drug supplementing interface is disposed on the drug dosing canister.

15. A drug dosing device for dosage metering and control, comprising a drug dosing canister, a first flow channel, a second flow channel, a third flow channel, a metering flow channel, a switch valve, a control valve and a pressure release port;
wherein an upper part or a top of the drug dosing canister communicates with an upper part or a top of the metering flow channel via the first flow channel;
a bottom or a lower part of the metering flow channel communicates with the control valve via the third flow channel;
a lower part or a bottom of the drug dosing canister communicates with third flow channel via the second flow channel, and the switch valve is disposed on the second flow channel;
the pressure release port is disposed at the upper part or the top of the drug dosing canister; and
the cross section area of the metering flow channel is less than the cross section area of the drug dosing canister.

16. A method for metering and controlling a drug dosing flow of the device of claim 1, comprising steps of:
1) introducing a pressure into the drug dosing canister via the pressure release port, and connecting an outlet of the control valve to a system device to be dosed;
2) opening the switch valve and the control valve, and adding functional chemical agents to the system device to be dosed;
3) closing the switch valve, collecting change values of liquid levels in the metering flow channel, and computing a drug dosing flow of the dosage;
4) if the drug dosing flow is too large, turning down a degree of opening of the control valve, collecting the change values of the liquid levels in the metering flow channel again, computing the drug dosing flow of the dosage again, and judging whether the drug dosing flow satisfies a need; otherwise, if the drug dosing flow is too small, turning up the degree of opening of the control valve, then collecting the change values of the liquid levels in the metering flow channel again, computing the drug dosing flow of the dosage again, and judging whether the drug dosing flow satisfies the need;
or, adopting the following steps for step 4): if the drug dosing flow is too large, first turning down the degree of opening of the control valve, then opening the switch valve until a liquid level in the metering flow channel and a liquid level in the drug dosing canister are balanced, then closing the switch valve, collecting the change values of the liquid levels in the metering flow channel, and computing the drug dosing flow of the dosage, and judging whether the drug dosing flow satisfies the need; otherwise, if the drug dosing flow is too small, first turning up the degree of opening of the control valve, then opening the switch valve until a liquid level in the metering flow channel and a liquid level in the drug dosing canister are balanced, then closing the switch valve, collecting the change values of the liquid levels in the metering flow channel and computing the drug dosing flow of the dosage, and judging whether the drug dosing flow satisfies the need;
5) repeating step 4) until the drug dosing flow is controlled to a required flow; and
6) opening the switch valve, and adding the drug in the drug dosing canister to the system device to be dosed according to a controlled required drug dosing flow.

17. A method for flow metering and control in a drug dosing process of a gas well in the device of claim 1, comprising steps of:
1) first communicating the pressure release port on the drug dosing canister with a sleeve valve of the gas well via a pressure release pipeline, and then communicating the control valve with an oil pipe valve of the gas well via a drug dosing pipeline;
2) then opening the switch valve, the control valve, the sleeve valve of the gas well, and the oil pipe valve of the gas well, enabling functional chemical agents in the drug dosing canister to enter the oil pipe valve successively through the switch valve, the metering flow channel, the control valve and the drug dosing pipeline under an effect of sleeve pressure; and automatically reaching a balance for a liquid level in the drug dosing canister and a liquid level in the metering flow channel;
3) closing the switch valve, collecting change values of liquid levels in the metering flow channel, and computing a drug dosing flow of the dosage;
4) if the drug dosing flow is too large, turning down a degree of opening of the control valve, then collecting the change values of the liquid levels in the metering flow channel again, computing the drug dosing flow of the dosage again, and judging whether the drug dosing flow satisfies a need; otherwise, if the drug dosing flow is too small, turning up a degree of opening of the control valve, then collecting the change values of the liquid levels in the metering flow channel again, computing the drug dosing flow of the dosage again, and judging whether the drug dosing flow satisfies the need;
or, adopting the following steps for step 4): if the drug dosing flow is too large, first turning down the degree of opening of the control valve, then opening the switch valve until a liquid level in the metering flow channel and a liquid level in the drug dosing canister are balanced, then closing the switch valve, collecting the change values of the liquid levels in the metering flow channel, computing the drug dosing flow of the dosage, and judging whether the drug dosing flow satisfies the need; otherwise, if the drug dosing flow is too small, first turning up the degree of opening of the control valve, then opening the switch valve until a liquid level in the metering flow channel and a liquid level in the drug dosing canister are balanced; then closing the switch valve, collecting the change values of the liquid levels in the metering flow channel, computing the drug dosing flow of the dosage, and judging whether the drug dosing flow satisfies the need;
5) repeating step 4) until the drug dosing flow is controlled to a required flow; and
6) opening the switch valve, and adding the drug in the drug dosing canister to the gas well according to a controlled required drug dosing flow.

18. A method for flow metering and control in a drug dosing process of a natural gas pipeline of a well site in the device of claim 1, comprising steps of:
1) first communicating the pressure release port on the drug dosing canister with a sleeve valve of a gas well via a pressure release pipeline, and then communicating the control valve with the natural gas pipeline of the well site via a drug dosing pipeline;
2) then opening the switch valve, the control valve and the sleeve valve of the gas well, enabling functional chemical agents in the drug dosing canister to enter the natural gas pipeline of the well site successively through the switch valve, the metering flow channel, the control valve and the drug dosing pipeline under an effect of sleeve pressure; and automatically reaching a balance for a liquid level in the drug dosing canister and a liquid level in the metering flow channel;
3) closing the switch valve, collecting change values of liquid levels in the metering flow channel, and computing a drug dosing flow of the dosage;
4) if the drug dosing flow is too large, turning down a degree of opening of the control valve, then collecting the change values of the liquid levels in the metering flow channel again, computing the drug dosing flow of the dosage again, and judging whether the drug dosing flow satisfies a need; otherwise, if the drug dosing flow is too small, turning up the degree of opening of the control valve, then collecting the change values of the liquid levels in the metering flow channel again, computing the drug dosing flow of the dosage again, and judging whether the drug dosing flow satisfies the need;
or, adopting the following steps for step 4): if the drug dosing flow is too large, first turning down the degree of opening of the control valve, then opening the switch valve until a liquid level in the metering flow channel and a liquid level in the drug dosing canister are balanced, then closing the switch valve, collecting the change values of the liquid levels in the metering flow channel, computing the drug dosing flow of the dosage, and judging whether the drug dosing flow satisfies the need; otherwise, if the drug dosing flow is too small, first turning up the degree of opening of the control valve, then opening the switch valve until a liquid level in the metering flow channel and a liquid level in the drug dosing canister are balanced; then closing the switch valve, collecting the change values of the liquid levels in the metering flow channel, computing the drug dosing flow of the dosage, and judging whether the drug dosing flow satisfies the need;
5) repeating step 4) until the drug dosing flow is controlled to a required flow; and
6) opening the switch valve, and adding the drug in the drug dosing canister to the natural gas pipeline of the well site according to a controlled required drug dosing flow.

19. A method for flow metering and control in a drug dosing process of an oil pipe of an oil well in the device of claim 1, comprising steps of:
1) first communicating the pressure release port on the drug dosing canister with a sleeve valve of the oil well via a pressure release pipeline, and then communicating the control valve with the oil pipe of the oil well via a drug dosing pipeline;
2) then opening the switch valve, the control valve, the sleeve valve of the oil well, and the oil pipe valve of the oil well, enabling functional chemical agents in the drug dosing canister to enter the oil pipe valve of the oil well successively through the switch valve, the metering flow channel, the control valve and the drug dosing pipeline under an effect of sleeve pressure of the oil well; and automatically reaching a balance for a liquid level in the drug dosing canister and a liquid level in the metering flow channel;

3) closing the switch valve, collecting change values of liquid levels in the metering flow channel, and computing a drug dosing flow of the dosage;
4) if the drug dosing flow is too large, turning down a degree of opening of the control valve; then, collecting the change values of the liquid levels in the metering flow channel again, computing the drug dosing flow of the dosage again, and judging whether the drug dosing flow satisfies a need; otherwise, if the drug dosing flow is too small, turning up the degree of opening of the control valve, then collecting the change values of the liquid levels in the metering flow channel again, computing the drug dosing flow of the dosage again, and judging whether the drug dosing flow satisfies the need;
or, adopting the following steps for step 4): if the drug dosing flow is too large, first turning down the degree of opening of the control valve, then opening the switch valve until a liquid level in the metering flow channel and a liquid level in the drug dosing canister are balanced, then closing the switch valve, collecting the change values of the liquid levels in the metering flow channel, computing the drug dosing flow of the dosage, and judging whether the drug dosing flow satisfies the need; otherwise, if the drug dosing flow is too small, first turning up the degree of opening of the control valve, then opening the switch valve until a liquid level in the metering flow channel and a liquid level in the drug dosing canister are balanced, then closing the switch valve, collecting the change values of the liquid levels in the metering flow channel, computing the drug dosing flow of the dosage, and judging whether the drug dosing flow satisfies the need;
5) repeating step 4) until the drug dosing flow is controlled to a required flow; and
6) opening the switch valve, and adding the drug in the drug dosing canister to the oil pipe of the oil well according to a controlled required drug dosing flow.

20. A method for flow metering and control in a drug dosing process of an interstation natural gas pipeline or an outer transportation pipeline of a gas gathering station in the device of claim 1, comprising steps of:
1) first communicating the pressure release port on the drug dosing canister with a station incoming pipeline of a gas well via a pressure release pipeline, and then communicating the control valve with the interstation natural gas pipeline or the outer transportation pipeline of the gas gathering station via a drug dosing pipeline;
2) then opening the switch valve and the control valve, enabling functional chemical agents in the drug dosing canister to enter the interstation natural gas pipeline or the outer transportation pipeline of the gas gathering station successively through the switch valve, the metering flow channel, the control valve and the drug dosing pipeline under an effect of pressure of the station incoming pipeline of the gas well; and automatically reaching a balance for a liquid level in the drug dosing canister and a liquid level in the metering flow channel;
3) closing the switch valve, collecting change values of liquid levels in the metering flow channel, and computing a drug dosing flow of the dosage;
4) if the drug dosing flow is too large, turning down a degree of opening of the control valve, then collecting the change values of the liquid levels in the metering flow channel again, computing the drug dosing flow of the dosage again, and judging whether the drug dosing flow satisfies a need; otherwise, if the drug dosing flow is too small, turning up the degree of opening of the control valve, then collecting the change values of the liquid levels in the metering flow channel again, computing the drug dosing flow of the dosage again, and judging whether the drug dosing flow satisfies the need;
or, adopting the following steps for step 4): if the drug dosing flow is too large, first turning down the degree of opening of the control valve, then opening the switch valve until a liquid level in the metering flow channel and a liquid level in the drug dosing canister are balanced, then closing the switch valve, collecting the change values of the liquid levels in the metering flow channel, computing the drug dosing flow of the dosage, and judging whether the drug dosing flow satisfies the need; otherwise, if the drug dosing flow is too small, first turning up the degree of opening of the control valve, then opening the switch valve until a liquid level in the metering flow channel and a liquid level in the drug dosing canister are balanced, then closing the switch valve, collecting the change values of the liquid levels in the metering flow channel, computing the drug dosing flow of the dosage, and judging whether the drug dosing flow satisfies the need;
5) repeating step 4) until the drug dosing flow is controlled to a required flow; and
6) opening the switch valve, and adding the drug in the drug dosing canister to the interstation natural gas pipeline or the outer transportation pipeline of the gas gathering station according to a controlled required drug dosing flow.

21. A method for flow metering and control in a drug dosing process of a natural gas pipeline of a well site in the device of claim 1, comprising steps of:
1) first elevating the bottom of the drug dosing canister to be greater than a height of the oil pipe valve of a gas production tree, then communicating the pressure release port on the drug dosing canister with a natural gas pipeline on one side of the gas production tree via a pressure release pipeline, and communicating the control valve with an oil pipe valve on the other side of the gas production tree via a drug dosing pipeline;
2) then opening the switch valve, the control valve and the oil pipe valve, enabling functional chemical agents in the drug dosing canister to enter the natural gas pipeline of the well site successively through the switch valve, the metering flow channel, the control valve, the drug dosing pipeline, the oil pipe valve and an upper four-way valve under a gravitational effect; and automatically reaching a balance for a liquid level in the drug dosing canister and a liquid level of the metering flow channel;
3) closing the switch valve, collecting change values of liquid levels in the metering flow channel, and computing a drug dosing flow of the dosage;
4) if the drug dosing flow is too large, turning down a degree of opening of the control valve, then, collecting the change values of the liquid levels in the metering flow channel again, computing the drug dosing flow of the dosage again, and judging whether the drug dosing flow satisfies a need; otherwise, if the drug dosing flow is too small, turning up the degree of opening of the control valve, then collecting the change values of the liquid levels in the metering flow channel again, computing the drug dosing flow of the dosage again, and judging whether the drug dosing flow satisfies the need;
or, adopting the following steps for step 4): if the drug dosing flow is too large, first turning down the degree of opening of the control valve, then opening the switch valve until a liquid level in the metering flow channel and a liquid level in the drug dosing canister are balanced, then closing the switch valve; collecting the change values of the liquid levels in the metering flow channel; computing the drug dosing flow of the dosage, and judging whether the drug dosing flow satisfies the need; otherwise, if the drug dosing flow is too small, first turning up the degree of opening of the control valve, then opening the switch valve until a liquid level in the metering flow channel and a liquid level in the drug dosing canister are balanced, then closing the switch valve; collecting the change values of the liquid levels in the metering flow channel, computing the drug dosing flow of the dosage, and judging whether the drug dosing flow satisfies the need;

5) repeating step 4) until the drug dosing flow is controlled to a required flow; and 6) opening the switch valve, and adding the drug in the drug dosing canister to the natural gas pipeline of the well site according to a controlled required drug dosing flow.

22. A method for flow metering and control in a drug dosing process of a sleeve of a gas well in the device of claim 1, comprising steps of:

1) first elevating the bottom of the drug dosing canister to be greater than a height of a sleeve valve of a gas production tree, then communicating the pressure release port on the drug dosing canister with the sleeve valve of the gas well on one side of the gas production tree via a pressure release pipeline, and communicating the control valve with the sleeve valve of the gas well on the other side of the gas production tree via a drug dosing pipeline;

2) then opening the switch valve, the control valve and the sleeve valve of the gas well, enabling functional chemical agents in the drug dosing canister to enter the sleeve of the gas well successively through the switch valve, the metering flow channel, the control valve and the drug dosing pipeline under a gravitational effect, and automatically reaching a balance for a liquid level in the drug dosing canister and a liquid level of the metering flow channel;

3) closing the switch valve, collecting change values of liquid levels in the metering flow channel, and computing a drug dosing flow of the dosage;

4) if the drug dosing flow is too large, turning down a degree of opening of the control valve, then collecting the change values of the liquid levels in the metering flow channel again; computing the drug dosing flow of the dosage again, and judging whether the drug dosing flow satisfies a need; otherwise, if the drug dosing flow is too small, turning up the degree of opening of the control valve, then collecting the change values of the liquid levels in the metering flow channel again, computing the drug dosing flow of the dosage again, and judging whether the drug dosing flow satisfies the need;

or, adopting the following steps for step 4): if the drug dosing flow is too large, first turning down the degree of opening of the control valve, then opening the switch valve until a liquid level in the metering flow channel and a liquid level in the drug dosing canister are balanced, then closing the switch valve, collecting the change values of the liquid levels in the metering flow channel, computing the drug dosing flow of the dosage, and judging whether the drug dosing flow satisfies the need; otherwise, if the drug dosing flow is too small, first turning up the degree of opening of the control valve, then opening the switch valve until a liquid level in the metering flow channel and a liquid level in the drug dosing canister are balanced, then closing the switch valve, collecting the change values of the liquid levels in the metering flow channel; computing the drug dosing flow of the dosage, and judging whether the drug dosing flow satisfies the need;

5) repeating step 4) until the drug dosing flow is controlled to a required flow; and 6) opening the switch valve, and adding the drug in the drug dosing canister to the sleeve of the gas well according to a controlled required drug dosing flow.

23. A method for flow metering and control in a drug dosing process of an oil pipe of a gas well in the device of claim 1, comprising steps of:

1) first elevating the bottom of the drug dosing canister to be greater than a height of an oil pipe valve of a gas production tree, then communicating the pressure release port on the drug dosing canister with an oil pipe of the gas well on one side of the gas production tree via a pressure release pipeline, and communicating the control valve with the same oil pipe of the gas well via a drug dosing pipeline;

2) then opening the switch valve, the control valve and the oil pipe valve of the gas well, enabling functional chemical agents in the drug dosing canister to enter the oil pipe of the gas well successively through the switch valve, the metering flow channel, the control valve and the drug dosing pipeline under a gravitational effect; and automatically reaching a balance for a liquid level in the drug dosing canister and a liquid level of the metering flow channel;

3) closing the switch valve, collecting change values of liquid levels in the metering flow channel, and computing a drug dosing flow of the dosage;

4) if the drug dosing flow is too large, turning down a degree of opening of the control valve, then collecting the change values of the liquid levels in the metering flow channel again; computing the drug dosing flow of the dosage again, and judging whether the drug dosing flow satisfies a need; otherwise, if the drug dosing flow is too small, turning up the degree of opening of the control valve, then, collecting the change values of the liquid levels in the metering flow channel again, computing the drug dosing flow of the dosage again, and judging whether the drug dosing flow satisfies the need;

or, adopting the following steps for step 4): if the drug dosing flow is too large, first turning down the degree of opening of the control valve, then opening the switch valve until a liquid level in the metering flow channel and a liquid level in the drug dosing canister are balanced, then closing the switch valve, collecting the change values of the liquid levels in the metering flow channel; computing the drug dosing flow of the dosage, and judging whether the drug dosing flow satisfies the need; otherwise, if the drug dosing flow is too small, first turning up the degree of opening of the control valve, then opening the switch valve until a liquid level in the metering flow channel and a liquid level in the drug dosing canister are balanced, then closing the switch valve; collecting the change values of the liquid levels in the metering flow channel; computing the drug dosing flow of the dosage, and judging whether the drug dosing flow satisfies the need;

5) repeating step 4) until the drug dosing flow is controlled to a required flow; and 6) opening the switch valve, and adding the drug in the drug dosing canister to the oil pipe of the gas well according to a controlled required drug dosing flow.

24. A method for flow metering and control in a drug dosing process of an oil well sleeve in the device of claim 1, comprising steps of:
1) first elevating the bottom of the drug dosing canister to be greater than a height of a sleeve valve of an oil production tree, then communicating the pressure release port on the drug dosing canister with the sleeve valve of the oil well on one side of the oil production tree via a pressure release pipeline, and communicating the control valve with the sleeve valve of the oil well on the other side of the oil production tree via a drug dosing pipeline;
2) then opening the switch valve, the control valve and the sleeve valve of the oil well, enabling functional chemical agents in the drug dosing canister to enter the oil well sleeve successively through the switch valve, the metering flow channel, the control valve and the drug dosing pipeline under a gravitational effect; and automatically reaching a balance for a liquid level in the drug dosing canister and a liquid level in the metering flow channel;
3) closing the switch valve, collecting change values of liquid levels in the metering flow channel, and computing a drug dosing flow of the dosage;
4) if the drug dosing flow is too large, turning down a degree of opening of the control valve, then collecting the change values of the liquid levels in the metering flow channel again, computing the drug dosing flow of the dosage again, and judging whether the drug dosing flow satisfies a need; otherwise, if the drug dosing flow is too small, turning up the degree of opening of the control valve, then collecting the change values of the liquid levels in the metering flow channel again, computing the drug dosing flow of the dosage again, and judging whether the drug dosing flow satisfies the need; or, adopting the following steps for step 4): if the drug dosing flow is too large, first turning down the degree of opening of the control valve, then opening the switch valve until a liquid level in the metering flow channel and a liquid level in the drug dosing canister are balanced; then closing the switch valve, collecting the change values of the liquid levels in the metering flow channel, computing the drug dosing flow of the dosage; judging whether the drug dosing flow satisfies the need; otherwise, if the drug dosing flow is too small, first turning up the degree of opening of the control valve, then opening the switch valve until a liquid level in the metering flow channel and a liquid level in the drug dosing canister are balanced, then closing the switch valve, collecting the change values of the liquid levels in the metering flow channel; computing the drug dosing flow of the dosage, and judging whether the drug dosing flow satisfies the need;
5) repeating step 4) until the drug dosing flow is controlled to a required flow; and
6) opening the switch valve, and adding the drug in the drug dosing canister to the oil well sleeve according to a controlled required drug dosing flow.

25. A method for flow metering and control in a drug dosing process of a liquid flow channel in the device of claim 1, comprising steps of:
1) first communicating the pressure release port on the drug dosing canister with a compressed gas source via a pressure release pipeline, and then communicating the control valve with the liquid flow channel via a drug dosing pipeline;
2) then opening the switch valve and the control valve, enabling functional chemical agents in the drug dosing canister to enter the liquid flow channel successively through the switch valve, the metering flow channel, the control valve and the drug dosing pipeline under an effect of pressure of the compressed gas source; and automatically reaching a balance for a liquid level in the drug dosing canister and a liquid level in the metering flow channel;
3) closing the switch valve, collecting change values of liquid levels in the metering flow channel, and computing a drug dosing flow of the dosage;
4) if the drug dosing flow is too large, turning down a degree of opening of the control valve, then collecting the change values of the liquid levels in the metering flow channel again; computing the drug dosing flow of the dosage again, and judging whether the drug dosing flow satisfies a need; otherwise, if the drug dosing flow is too small, turning up the degree of opening of the control valve, then, collecting the change values of the liquid levels in the metering flow channel again, computing the drug dosing flow of the dosage again, and judging whether the drug dosing flow satisfies the need; or, adopting the following steps for step 4): if the drug dosing flow is too large, first turning down the degree of opening of the control valve, then opening the switch valve until a liquid level in the metering flow channel and a liquid level in the drug dosing canister are balanced, then closing the switch valve, collecting the change values of the liquid levels in the metering flow channel, computing the drug dosing flow of the dosage, and judging whether the drug dosing flow satisfies the need; otherwise, if the drug dosing flow is too small, first turning up the degree of opening of the control valve, then opening the switch valve until a liquid level in the metering flow channel and a liquid level in the drug dosing canister are balanced, then closing the switch valve, collecting the change values of the liquid levels in the metering flow channel, computing the drug dosing flow of the dosage, and judging whether the drug dosing flow satisfies the need;
5) repeating step 4) until the drug dosing flow is controlled to a required flow; and
6) opening the switch valve, and adding the drug in the drug dosing canister to the liquid flow channel according to a controlled required drug dosing flow.

26. The method for flow metering and control according to claim 25, wherein the compressed gas source is any one of a nitrogen gas bottle, a liquefied gas bottle, an oxygen gas bottle, an acetylene bottle, a carbon dioxide gas canister, a compressed natural gas canister, instrument air, an air compressor, a pressure fan, a gas pump, a mobile compressed gas source, liquid nitrogen, liquid carbon dioxide and liquefied gas.

27. A method for flow metering and control in a drug dosing process of an interstation natural gas pipeline or an outer transportation pipeline of a gas gathering station in the device of claim 1, comprising steps of:
1) first elevating the bottom of the drug dosing canister to be greater than a height of the interstation natural gas pipeline or the outer transportation pipeline of the gas gathering station, then communicating the pressure release port on the drug dosing canister with the interstation natural gas pipeline or the outer transportation pipeline of the gas gathering station via a pressure release pipeline, and communicating the control valve with the interstation natural gas pipeline or the outer transportation pipeline of the gas gathering station via a drug dosing pipeline;

2) then opening the switch valve and the control valve, enabling functional chemical agents in the drug dosing canister to enter the interstation natural gas pipeline or the outer transportation pipeline of the gas gathering station successively through the switch valve, the metering flow channel, the control valve and the drug dosing pipeline under a gravitational effect; and automatically reaching a balance for a liquid level in the drug dosing canister and a liquid level in the metering flow channel;

3) closing the switch valve, collecting change values of liquid levels in the metering flow channel, and computing a drug dosing flow of the dosage;

4) if the drug dosing flow is too large, turning down a degree of opening of the control valve, then, collecting the change values of the liquid levels in the metering flow channel again; computing the drug dosing flow of the dosage again, and judging whether the drug dosing flow satisfies a need; otherwise, if the drug dosing flow is too small, turning up the degree of opening of the control valve, then collecting the change values of the liquid levels in the metering flow channel again, computing the drug dosing flow of the dosage again, and judging whether the drug dosing flow satisfies the need;

or, adopting the following steps for step 4): if the drug dosing flow is too large, first turning down the degree of opening of the control valve, then opening the switch valve until a liquid level in the metering flow channel and a liquid level in the drug dosing canister are balanced, then closing the switch valve; collecting the change values of the liquid levels in the metering flow channel, computing the drug dosing flow of the dosage, and judging whether the drug dosing flow satisfies the need; otherwise, if the drug dosing flow is too small, first turning up the degree of opening of the control valve, then opening the switch valve until a liquid level in the metering flow channel and a liquid level in the drug dosing canister are balanced, then closing the switch valve; collecting the change values of the liquid levels in the metering flow channel, computing the drug dosing flow of the dosage, and judging whether the drug dosing flow satisfies the need;

5) repeating step 4) until the drug dosing flow is controlled to a required flow; and 6) opening the switch valve, and adding the drug in the drug dosing canister to the interstation natural gas pipeline or the outer transportation pipeline of the gas gathering station according to a controlled required drug dosing flow.

* * * * *